United States Patent
Sim et al.

(10) Patent No.: US 11,716,159 B2
(45) Date of Patent: Aug. 1, 2023

(54) RADIO FREQUENCY AUTOMATIC GAIN CONTROL WITH DETECTOR FOR LINEAR MODULATION INTERFERER SIGNAL

(71) Applicant: MOTOROLA SOLUTIONS, INC., Chicago, IL (US)

(72) Inventors: Moh Lim Sim, Penang (MY); Boon Heng Fong, Penang (MY); Ariel L. Galan, Ft. Lauderdale, FL (US); Ondy Dharma Indra, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/452,372

(22) Filed: Oct. 26, 2021

(65) Prior Publication Data
US 2023/0132055 A1    Apr. 27, 2023

(51) Int. Cl.
*H04B 17/327* (2015.01)
*H04B 17/13* (2015.01)
*H04B 17/345* (2015.01)

(52) U.S. Cl.
CPC ........... *H04B 17/327* (2015.01); *H04B 17/13* (2015.01); *H04B 17/345* (2015.01)

(58) Field of Classification Search
CPC .... H04B 1/109; H04B 1/1027; H04B 1/1036; H04B 17/327; H04B 17/13; H04B 17/345; H04B 1/0475; H04B 1/12; H04B 17/318; H03F 1/3247
See application file for complete search history.

(56) References Cited

U.S. PATENT DOCUMENTS

| 8,472,571 B2 | 6/2013 | Desai |
| 8,855,570 B2 | 10/2014 | Wilhelmsson |
| 9,887,717 B2 | 2/2018 | Cyzs et al. |
| 10,425,187 B2 | 9/2019 | Chendamarai Kannan et al. |
| 10,985,955 B2 | 4/2021 | Chen et al. |
| 2002/0127986 A1* | 9/2002 | White ............... H03F 1/3235 455/194.2 |
| 2004/0203403 A1* | 10/2004 | Cutcher ............... H03G 3/34 455/63.1 |
| 2007/0105519 A1* | 5/2007 | Perkins ............... H04B 1/109 455/295 |

(Continued)

*Primary Examiner* — Quoc Thai N Vu
(74) *Attorney, Agent, or Firm* — Michael Best & Friedrich LLP

(57) ABSTRACT

One example communication device receives a radio frequency (RF) signal. The communication device may include a radio frequency integrated circuit (RFIC) that includes an internal attenuator. The RFIC and other processing circuitry may convert the received RF signal to a baseband frequency to generate a processed complex baseband signal. A digital signal processor of the communication device may determine, based on detection of or lack of detection of distortion terms in a frequency spectrum of the processed complex baseband signal at frequencies corresponding to integer multiples of a symbol rate of a linear modulation interferer, a modulation type of an interferer signal that forms at least part of the processed complex baseband signal. The digital signal processor may also control whether the internal attenuator is enabled based on a received signal strength indication (RSSI) of a desired RF signal and the modulation type of the interferer signal.

20 Claims, 12 Drawing Sheets

(56) References Cited

U.S. PATENT DOCUMENTS

2012/0329415 A1* 12/2012 Ruijter ................. H03G 3/3052
                                                    455/226.2
2017/0244388 A1*  8/2017 Ashry Othman .... H03H 11/245
2021/0175870 A1*  6/2021 Pereira ................. H04B 1/0458

* cited by examiner

RADIO FREQUENCY AUTOMATIC GAIN CONTROL WITH DETECTOR FOR LINEAR MODULATION INTERFERER SIGNAL

BACKGROUND OF THE INVENTION

Communication devices, such as two-way radios or land mobile radios, are used in many applications by public safety and other organizations. Communication devices may use radio frequency (RF) communication to communication with each other. However, interferer signals may block and/or distort RF communication between communication devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
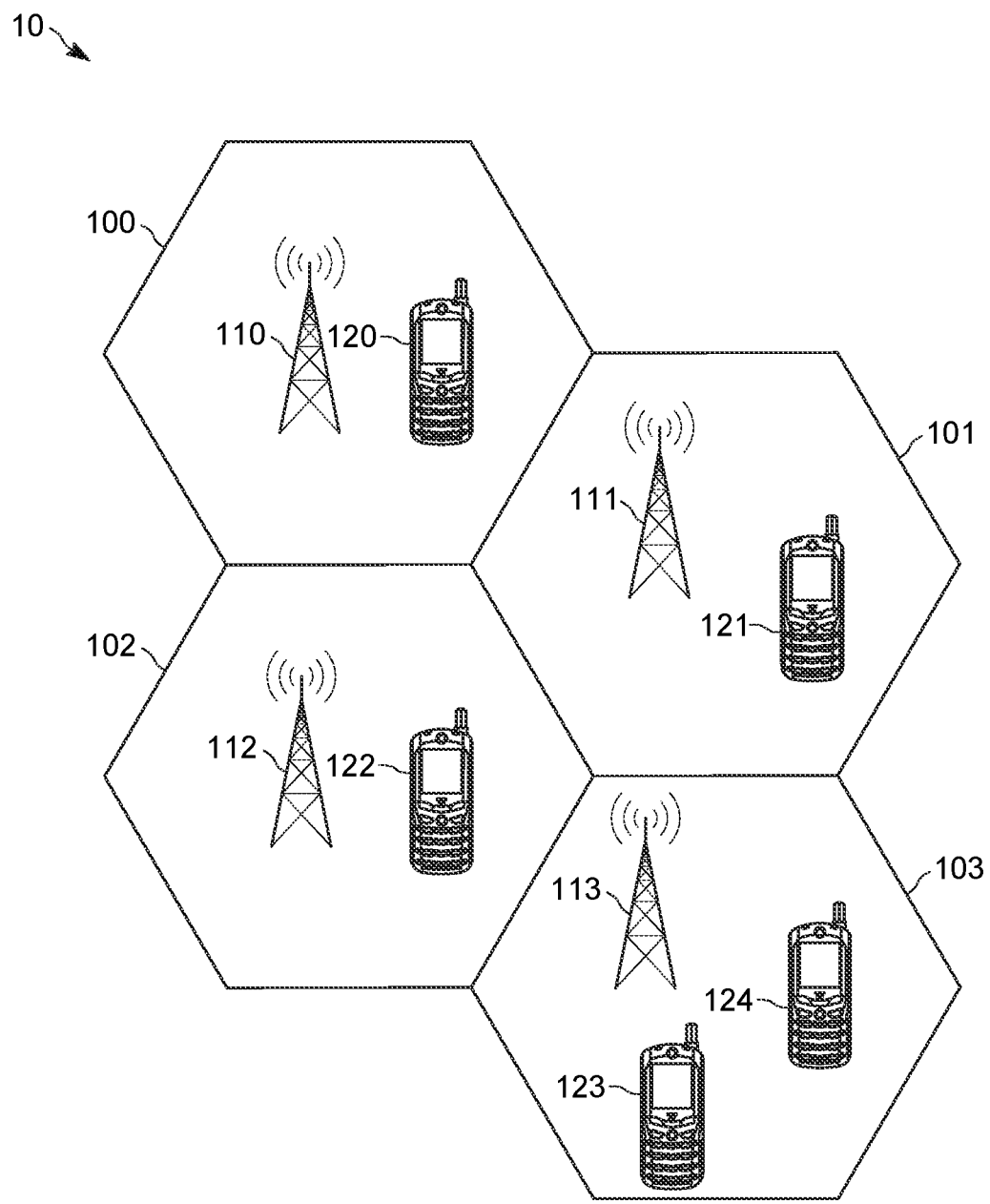
FIG. 1 is a system diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, interferer signals may block and/or distort radio frequency (RF) communication between communication devices. Some communication devices include multiple signal attenuators to reduce the power of received RF signals that include strong blocking/off-channel interferer signals to help the communication devices more accurately receive and interpret a desired RF signal. However, existing methods of controlling the attenuators of a communication device control both attenuators in the same manner and do not take into account a type of off-channel interferer signal that is present in the received RF signal. Rather, existing methods of controlling attenuators of the communication device merely use a power level of the received RF signal to determine whether to engage both attenuators of the communication device.

For example, both attenuators may be enabled strictly in response to a hardware off-channel detector circuit determining that an out-of-band power of the received RF signal exceeds a predetermined threshold. However, the hardware off-channel detector circuit is not able to differentiate between a constant envelope (CE) interferer signal (e.g., a constant envelope frequency modulated (CEFM) signal, a land mobile radio (LMR) signal, and the like) and a linear modulation interferer signal (e.g., Association of Public-Safety Communications Officials linear simulcast modulation (APCO LSM), harmonized differential quadrature phase shift keying (HDQPSK), terrestrial trunked radio (TETRA) with quadrature phase shift keying (QPSK), and the like). Thus, to protect the receiver of the communication device against worst case interferer signals, the power level threshold used by existing methods in the determination of whether to enable the attenuators must assume the presence of a worst case interferer signal.

However, using such existing methods results in needlessly reduced receiver sensitivity when certain types of interferer signals (e.g., constant envelope interferer signals) are present since constant envelope interferer signals can be tolerated by the communication device more than other types of interferer signals (e.g., linear modulation interferer signals that create second order intermodulation distortion components). In other words, strong linear modulation interferer signals create second order intermodulation distortion components at high baseband frequency that more strongly block/distort a desired RF signal than constant envelope interferer signals that create second order intermodulation distortion components at high baseband frequency that do not block/distort (or block/distort less) the desired RF signal. For example, the constant envelope interferer signals create second order intermodulation distortion components at a frequency of approximately 0 Hz that does not strongly block/distort the desired RF signal. On the other hand, the linear modulation interferer signals create second order intermodulation distortion components at non-zero frequencies that more strongly block/distort the desired RF signal. Thus, there is a technological problem with existing methods of controlling attenuators of a communication device because controlling both attenuators to be enabled or disabled in the same manner based exclusively on the power level of a received RF signal results in decreased receiver sensitivity with respect to the desired RF signal in many situations.

Among other things, some embodiments provided herein explain specific control methods for controlling different attenuators of a communication device differently based at least in part on a type of interferer signal detected within a received RF signal (e.g., based on whether the received RF signal is determined to include a linear modulation interferer signal). The embodiments described herein provide, among other things, an improvement to attenuating strong interferer signals by allowing for strong interferer signals of various types to be attenuated differently to reduce the negative effects that the attenuation has on receiver sensitivity with respect to the desired RF signal. In other words, the more refined/gradient control methods described herein are an improvement over the existing, more blunt control method that involves controlling both attenuators in the same manner based strictly on the power level of the received RF signal. Thus, a received signal strength indication (RSSI) of the desired RF signal and communication between communication devices in general may be improved using the one or more of the methods described herein. For example, signal-to-noise and distortion (SINAD) of the desired RF signal is improved using the methods described herein. Such SINAD improvement translates to improved fade margin, improved audio quality, improved receiver blocking, and improved hum and noise compared to existing control methods that, for example, involve controlling both attenuators in the same manner based strictly on the power level of the received RF signal. In some embodiments, the SINAD improvements result from not engaging an internal attenuator in certain circumstances when only constant envelope interferer signals are present and/or from not engaging the external attenuator too early in certain circumstances when a linear modulation interferer signal is present as explained in greater detail below.

One embodiment provides a communication device that may include a microphone, a speaker, and an antenna that may be configured to receive a radio frequency (RF) signal. The communication device may also include processing circuitry configured to receive the RF signal from the antenna and process the RF signal to generate a processed RF signal. The communication device may also include a radio frequency integrated circuit (RFIC) configured to receive the processed RF signal. The RFIC may include an internal attenuator controllable to be (i) enabled such that the processed RF signal is attenuated by the internal attenuator or (ii) disabled such that the processed RF signal is not attenuated by the internal attenuator. The RFIC may also include a mixer configured to convert the processed RF signal to a baseband frequency to generate a processed complex baseband signal. The communication device may also include a digital signal processor that may be configured to receive the processed complex baseband signal. The digital signal processor may also be configured to determine a received signal strength indication (RSSI) of a desired signal that forms at least part of the processed complex baseband signal. The digital signal processor may also be configured to determine a modulation type of an interferer signal that forms at least part of the processed complex baseband signal. The modulation type may be determined based on detection of or lack of detection of distortion terms in a frequency spectrum of the processed complex baseband signal at frequencies corresponding to integer multiples of a symbol rate of a linear modulation interferer. The digital signal processor may also be configured to control whether the internal attenuator is enabled or disabled based on the RSSI of the desired signal and the modulation type of the interferer signal.

Another embodiment provides a method of controlling a signal attenuator. The method may include receiving a radio frequency (RF) signal with an antenna of a communication device. The method may also include receiving, with processing circuitry of the communication device, the RF signal from the antenna. The method may also include processing, with the processing circuitry, the RF signal to generate a processed RF signal. The method may also include receiving, with a radio frequency integrated circuit (RFIC), the processed RF signal from the processing circuitry. The RFIC may include an internal attenuator controllable to be (i) enabled such that the processed RF signal is attenuated by the internal attenuator or (ii) disabled such that the processed RF signal is not attenuated by the internal attenuator. The method may also include converting, with a mixer of the RFIC, the processed RF signal to a baseband frequency to generate a processed complex baseband signal. The method may also include receiving, with a digital signal processor, the processed complex baseband signal from the RFIC. The method may also include determining, with the digital signal processor, a received signal strength indication (RSSI) of a desired signal that forms at least part of the processed complex baseband signal. The method may also include determining, with the digital signal processor, a modulation type of an interferer signal that forms at least part of the processed complex baseband signal. The modulation type may be determined based on detection of or lack of detection of distortion terms in a frequency spectrum of the processed complex baseband signal at frequencies corresponding to integer multiples of a symbol rate of a linear modulation interferer. The method may also include controlling, with the digital signal processor, whether the internal attenuator is enabled or disabled based on the RSSI of the desired signal and the modulation type of the interferer signal.

Another embodiment provides a communication device that may include a microphone, a speaker, and an antenna configured to receive a radio frequency (RF) signal. The communication device may also include processing circuitry that may be configured to receive the RF signal from the antenna and process the RF signal to generate a processed RF signal. The processing circuitry may include an external attenuator controllable to be (i) enabled such that the RF signal is attenuated by the external attenuator or (ii) disabled such that the RF signal is not attenuated by the external attenuator. The communication device may also include a radio frequency integrated circuit (RFIC) configured to receive the processed RF signal. The RFIC may include an internal attenuator controllable to be (i) enabled such that the processed RF signal is attenuated by the internal attenuator or (ii) disabled such that the processed RF signal is not attenuated by the internal attenuator. The RFIC may also include a mixer configured to convert the processed RF signal to a baseband frequency to generate a processed complex baseband signal. The communication device may also include a digital signal processor that may be configured to receive the processed complex baseband signal. The digital signal processed may also be configured to determine whether the processed complex baseband signal includes a linear modulation interferer signal having a second order intermodulation distortion (IM2) distortion-to-noise ratio above a predetermined threshold. The digital signal processor may also be configured to, in response to and based on determining that the processed complex baseband signal includes the linear modulation interferer signal having the second order intermodulation distortion distortion-to-noise ratio above the predetermined threshold, control whether at least one of the internal attenuator and the external attenuator is enabled.

FIG. 1 is a diagram of a communication system 10 according to one embodiment. In the example shown, the communication system 10 includes a first communication cell 100, a second communication cell 101, a third communication cell 102, and a fourth communication cell 103, each indicative of a coverage area (for example, coverage range) of a first communication tower 110, a second communication tower 111, a third communication tower 112, and a fourth communication tower 113, respectively. Each communication tower 110-113 may be, for example, a radio or cellular tower, a base station, a repeater, or the like. The communication system 10 also includes a first communication device 120, a second communication device 121, a third communication device 122, a fourth communication device 123, and a fifth communication device 124. The communication devices 120-124 may be, for example, mobile radios, push-to-talk-devices, mobile phones, personal digital assistants (PDAs), or similar devices capable of half-duplex and/or full-duplex communication.

The communication system 10 may be implemented using various existing networks that communicate using radio frequency (RF) signals, for example, a cellular network, a Long Term Evolution (LTE) network, a 3GPP compliant network, a 5G network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The communication system 10 may also include future developed networks. In some embodiments, the communication system 10 may also implement a combination of the networks mentioned previously herein. In some embodiments, the communication devices 120-124 communicate directly with each other using a communication channel or connection that is outside of the communication system 10. For example, the plurality of communication devices 120-124 may communicate directly with each other when they are within a predetermined distance from each other, such as the fourth communication device 123 and the fifth communication device 124. In some embodiments, the communication devices 120-124 communicate using the respective communication towers 110-113 that is in the same communication cell 100-103 as the respective communication device 120-124. For example, the first communication device 120 may transmit a communication signal (e.g., an RF signal) to the first communication tower 110, as each are located within the first communication cell 100. The first communication tower 110 may transmit the communication signal (e.g., the RF signal) to the second communication tower 111. The second communication tower 111 then may transmit the communication signal (e.g., the RF signal) to the second communication device 121, as each are located within the second communication cell 101.

Figure 2:
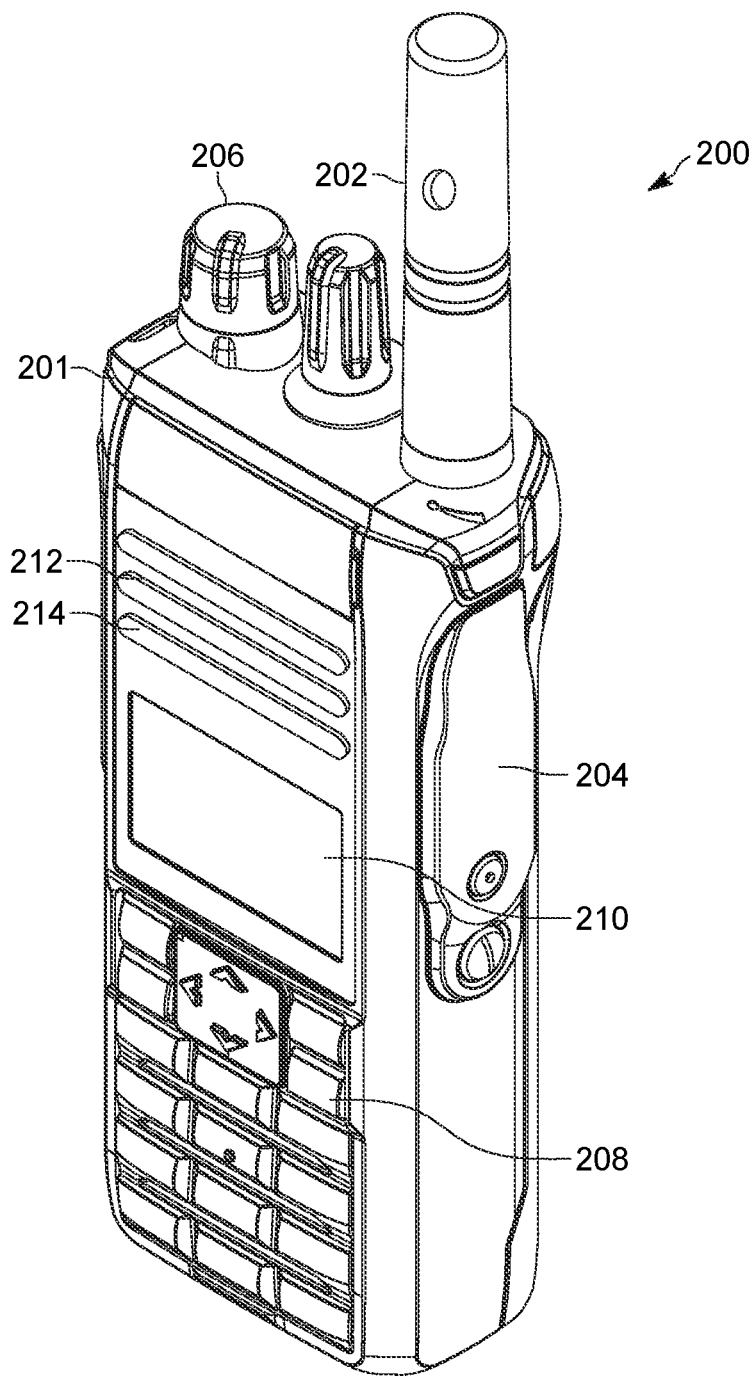
FIG. 2 is a diagrams of a communication device included in the communication system of FIG. 1 in accordance with some embodiments.
Figure 3:
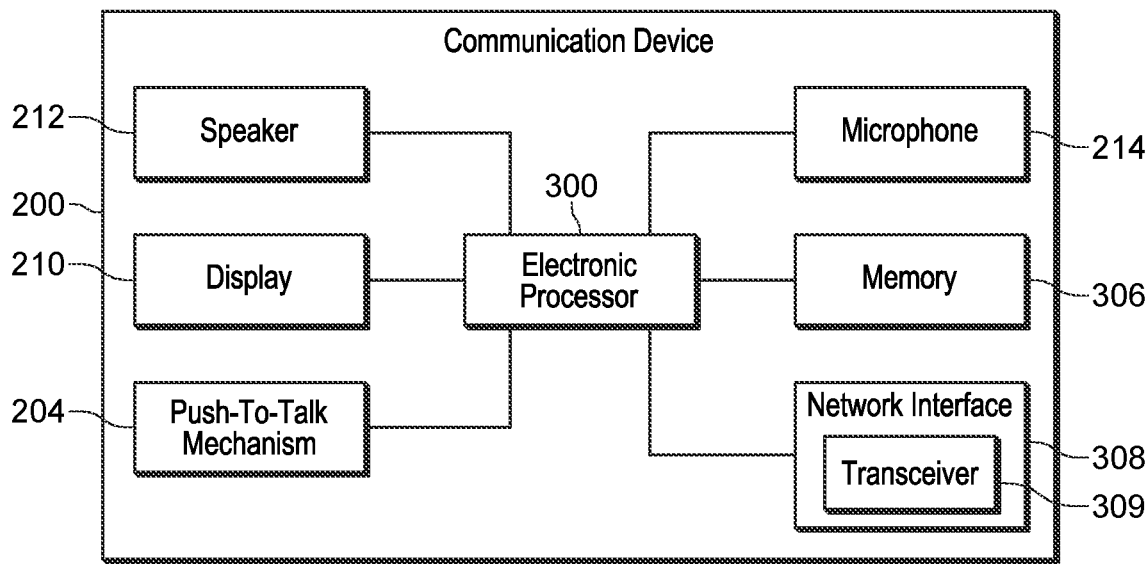
FIG. 3 is a block diagram of the communication device of FIG. 2 in accordance with some embodiments.

FIG. 2 illustrates a communication device 200 of the communication system 10. The communication device 200 may be similar to at least one of the communication devices 120-124. The explanation of the communication devices 120-124 applies to the communication device 200, and the explanation of the communication device 200 applies to the communication devices 120-124. In some embodiments, the communication device 200 includes a radio housing 201, an antenna 202, a push-to-talk mechanism 204, a frequency tuner 206, a keypad 208, a display 210, a speaker 212, and a microphone 214. The antenna 202 may be configured to transmit and receive RF signals in conjunction with a transceiver 309 (shown in FIG. 3). In some embodiments, the antenna 202 transmits and receives RF signals with the same frequency as set by the frequency tuner 206. The frequency tuner 206 may be, for example, a dial, a switch, a setting changeable with the keypad 208, or the like. The push-to-talk mechanism 204 is configured to allow the communication device 200 to transmit RF signals when activated. The push-to-talk mechanism 204 may be, for example, a push-button, a trigger, a switch, or the like.

In some embodiments, the display 210 presents a graphical user interface (GUI) that shows various parameters of the communication device 200. For example, the GUI is generated on the display 210 by software/firmware running on an electronic processor 300 (see FIG. 3). The display 210 may provide, for example, the current battery level of the communication device 200, the current frequency at which the communication device 200 operates, a list of tasks for a user of the communication device 200, an emergency alert, and various other parameters and reports related to the function of the communication device 200. The keypad 208 may allow a user to interact with information shown on the display 210. For example, the keypad 208 may allow a user to enter a status report, transmit alerts to other devices, change the frequency at which the communication device 200 operates, or the like. In some embodiments, the display 210 is a touchscreen display that also receives user inputs from the user.

In some embodiments, the communication device 200 is capable of half-duplex communication. For example, the push-to-talk mechanism 204 may control an operating mode of the communication device 200. When the push-to-talk mechanism 204 is actuated, the communication device 200 may enable the microphone 214 and disable the ability of the speaker 212 to provide an acoustic output, entering a transmission mode. In the transmission mode, the microphone 214 may be configured to convert sound waves to a digital audio signal (for example, a first audio signal). In some embodiments, when the push-to-talk button is released, the communication device 200 may disable the microphone 214 and enable the speaker 212, entering a receiving mode. In the receiving mode, the speaker 212 may be configured to convert electrical signals received using the antenna 202 to an acoustic output.

FIG. 3A is a block diagram of the communication device 200 of the communication system 10 according to one embodiment. In the example shown, the communication device 200 includes an electronic processor 300 (for example, a microprocessor or another electronic device).

The electronic processor 300 may be electrically connected to the speaker 212, the microphone 214, the display 210, the push-to-talk mechanism 204, a memory 306, and a network interface 308. In some embodiments, the communication device 200 may include fewer or additional components in configurations different from that illustrated in FIG. 3. For example, in some embodiments, the communication device 200 also includes a camera, a location component (for example, a global positioning system receiver), and/or an accessory port to couple to an accessory device. As another example, the communication device 200 may not include the push-to-talk mechanism 204. In some embodiments, the communication device 200 performs additional functionality than the functionality described below.

The memory 306 includes read only memory (ROM), random access memory (RAM), other non-transitory computer-readable media, or a combination thereof. The electronic processor 300 is configured to receive instructions and data from the memory 306 and execute, among other things, the instructions. In particular, the electronic processor 300 executes instructions stored in the memory 306 to perform the methods described herein. In some embodiments, the electronic processor 300 and the memory 306 may collectively be referred to as a microcontroller or electronic controller. In some embodiments, the memory 306 may be integrated into the electronic processor 300.

The network interface 308 sends and receives data to and from components of the communication system 10. For example, the network interface 308 may include a transceiver 309 for wirelessly communicating with components of the communication system 10 using the antenna 202, which may be coupled to the transceiver 309. Alternatively or in addition, the network interface 308 may include a connector or port to establish a wired connection to components of the communication system 10. The electronic processor 300 receives electrical signals representing sound from the microphone 214 and may communicate information related to the electrical signals over communication system 10 through the network interface 308. The information may be intended for receipt by another communication device 200. Similarly, the electronic processor 300 may output data received from components of the communication system 10 through the network interface 308, for example, as from another communication device 200, through the speaker 212, the display 210, or a combination thereof. In some embodiments, the antenna 202 may be considered to be part of the network interface 308.

Figure 4A:
FIG. 4A is a signal flow diagram that illustrates elements of the communication device of FIG. 2 that receive and process RF signals according to one embodiment.
Figure 4A:
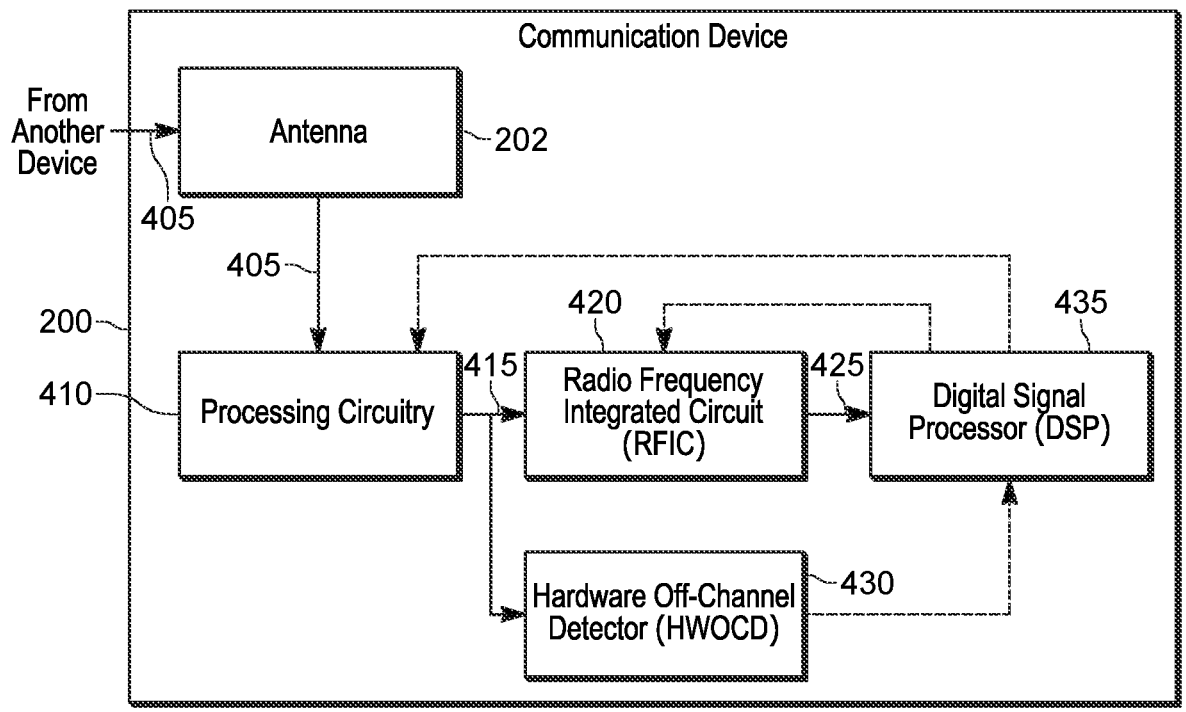

FIG. 4A is a signal flow diagram that illustrates elements of the communication device 200 that receive and process RF signals according to one embodiment. In some embodiments, the antenna 202 receives an RF signal 405 from another device (e.g., from another communication device 200 via one of the communication towers 110-113). In some embodiments, the antenna 202 is coupled to processing circuitry 410 that is configured to receive the RF signal 405 from the antenna 202 and process the RF signal 405 to generate a processed RF signal 415. In some embodiments, the antenna 202 may include its own processing/conditioning circuitry to process/condition the RF signal 405 before transmitting the RF signal 405 to the processing circuitry 410. The processing circuitry 410 is explained in greater detail below with respect to FIG. 4B.

In some embodiments, the processing circuitry 410 is coupled to a radio frequency integrated circuit (RFIC) 420 that is configured to receive the processed RF signal 415 from the processing circuitry 410 and further process the processed RF signal 415 to generate a processed complex baseband signal 425. The RFIC 420 is explained in greater detail below with respect to FIG. 4C.

In some embodiments, the communication device 200 includes a hardware off-channel detector (HWOCD) circuit 430 that is also configured to receive the processed RF signal 415 from the processing circuitry 410. For example, the hardware off-channel detector 430 is a logarithmic detector configured to determine a power level of the processed RF signal 415. As shown in FIG. 4A, the hardware off-channel detector 430 may be coupled to a digital signal processor (DSP) 435 and may be configured to provide an output to the DSP 435 that indicates the power level of the processed RF signal 415. For example, the output from the hardware off-channel detector 430 may indicate whether the power level of the processed RF signal 415 is above a predetermined hardware off-channel detector power level threshold that indicates one or more attenuators should be enabled. However, in some embodiments, the hardware off-channel detector 430 may not be able to differentiate between a constant envelope interferer signal and a linear modulation interferer signal. In other words, the hardware off-channel detector 430 may not be able to determine a modulation type of an interferer signal that forms at least part of the processed RF signal 415.

In some embodiments, RFIC 420 is coupled to the DSP 435, and the processed complex baseband signal 425 generated by the RFIC 420 is provided to the DSP 435 by the RFIC 420. In some embodiments, the DSP 435 performs one or more methods described herein to perform automatic gain control of one or more attenuators included in the communication device 200 based at least partially on the processed complex baseband signal 425. In some embodiments, the DSP 435 performs automatic gain control based at least partially on the power level of processed RF signal 415 received from the hardware off-channel detector circuit 430. The DSP 435 is explained in greater detail below with respect to FIG. 4D.

Although FIG. 4A generally shows the antenna 202, the processing circuitry 410, the RFIC 420, the hardware off-channel detector 430, and the DSP 435 as separate components of the communication device 200, in some embodiments, at least some of these components are combined together and/or may be included in other components of the communication device 200. For example, at least one of the antenna 202, the processing circuitry 410, and the RFIC 420 may be part of the transceiver 309 and/or the network interface 308. As another example, the DSP 435 may be a part of the electronic processor 300. In other words, in some embodiments, the electronic processor 300 may perform the functions of the DSP 435 described herein. In some embodiments, the communication device 200 may include fewer or additional components in configurations different from that illustrated in FIG. 4A. For example, in some embodiments, the communication device 200 may not include the hardware off-channel detector 430.

Figure 4B:
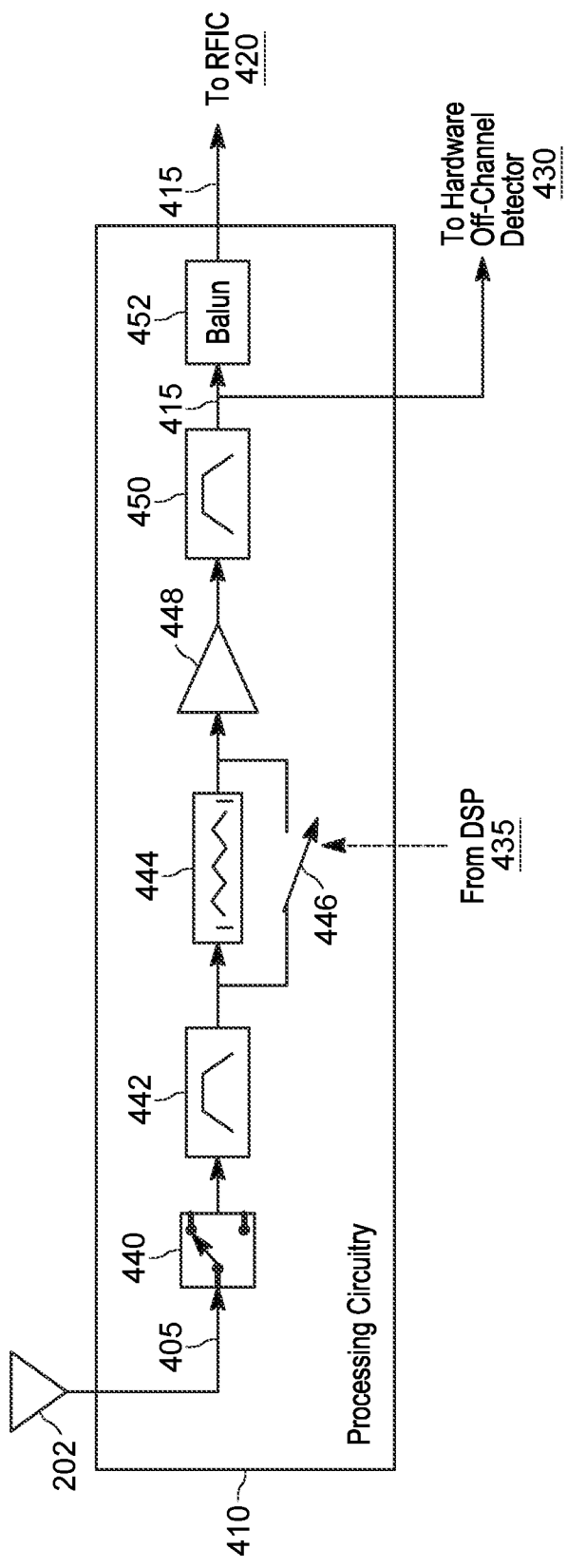
FIG. 4B is a signal flow diagram that illustrates elements of processing circuitry of the communication device of FIG. 2 that receive and process RF signals according to one embodiment.

FIG. 4B is a signal flow diagram of the elements of the processing circuitry 410 of the communication device 200 that receive and process RF signals according to one embodiment. In some embodiments, the processing circuitry 410 includes a switch 440 (e.g., a single pole double throw (SPDT switch)). In some embodiments, the switch 440 allows a received RF signal to be processed by the receiver circuits of the communication device 200 during receiving and allows a transmitter circuit of the communication device 200 to send a signal to the antenna 202 to be transmitted as an RF signal. In some embodiments, the RF signal 405 passes through a first bandpass filter 442. After passing through the first bandpass filter 442, the RF signal 405 may or may not be attenuated by an external attenuator 444 (e.g., an external step attenuator). In some embodiments, an external attenuator switch 446 controls whether the RF signal 405 passes through the external attenuator 444 to be attenuated or bypasses the external attenuator 444 without being attenuated. In some embodiments, a state of the external attenuator switch 446 is controlled by the DSP 435 as explained in greater detail below.

After passing through the external attenuator 444 or bypassing the external attenuator 444, the RF signal 405 may pass through a first low-noise amplifier 448. In some embodiments, the RF signal 405 then passes through a second bandpass filter 450. In some embodiments, after passing through the second bandpass filter 450, the RF signal 405 may now be considered the processed RF signal 415. In some embodiments, the processed RF signal 415 is transmitted to the hardware off-channel detector 430. The processed RF signal 415 may also be transmitted to the RFIC 420 for further processing.

Figure 4C:
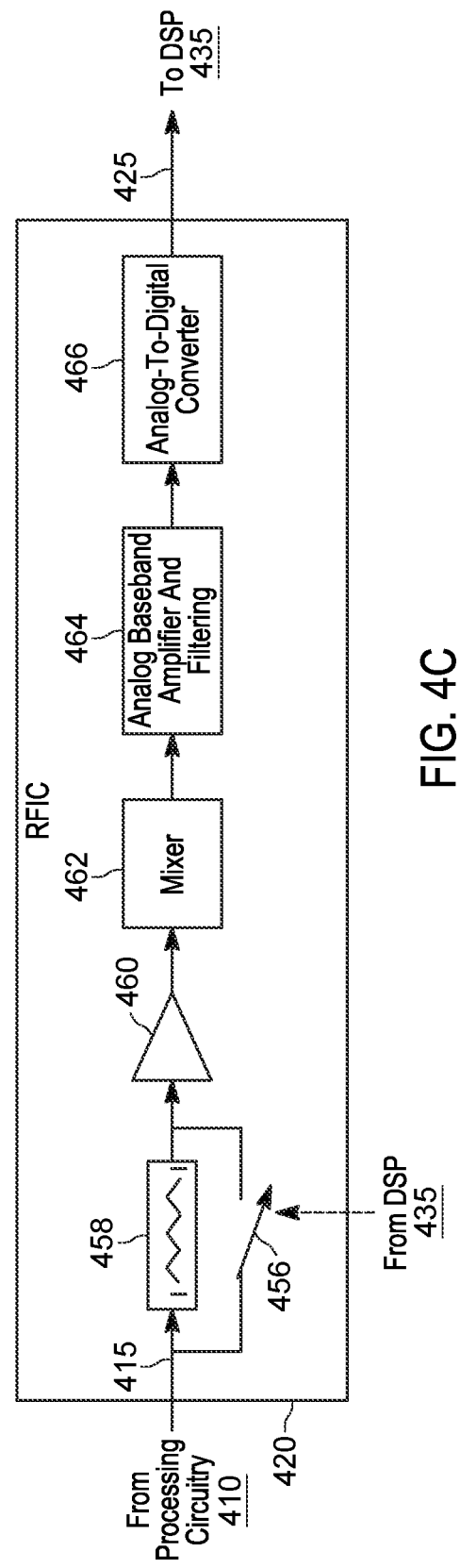
FIG. 4C is a signal flow diagram of elements of a radio frequency integrated circuit (RFIC) of the communication device of FIG. 2 that receive and process RF signals according to one embodiment.

FIG. 4C is a signal flow diagram of elements of the RFIC 420 of the communication device 200 that receive and process RF signals according to one embodiment. In some embodiments, the RFIC 420 receives the processed RF signal 415 from the processing circuitry 410. In some embodiments, an internal attenuator switch 456 controls whether the processed RF signal 415 passes through an internal attenuator 458 (e.g., an internal step attenuator) to be attenuated or bypasses the internal attenuator 458 without being attenuated. In some embodiments, the internal attenuator 458 is referred to as "internal" because the internal attenuator 458 is located within the RFIC 420. Similarly, the external attenuator 444 may be referred to as "external" because the external attenuator 444 is located outside of the RFIC 420. In some embodiments, the attenuators 444 and 458 may be located within or outside of the same component but may still be located at different points on a signal processing path between the antenna 202 and the DSP 435.

After passing through the internal attenuator 458 or bypassing the internal attenuator 458, the processed RF signal 415 passes through a second low-noise amplifier 460. The processed RF signal 415 may then pass through a mixer 462 (e.g., a quadrature mixer). The processed RF signal 415 may then be analog baseband amplified and filtered at block 464 after which the processed RF signal 415 passes through an analog-to-digital converter (ADC) 466. After passing through the ADC 466, the processed RF signal 415 may be considered the processed complex baseband signal 425. In some embodiments, the processed complex baseband signal 425 is transmitted to the DSP 435.

Figure 4D:
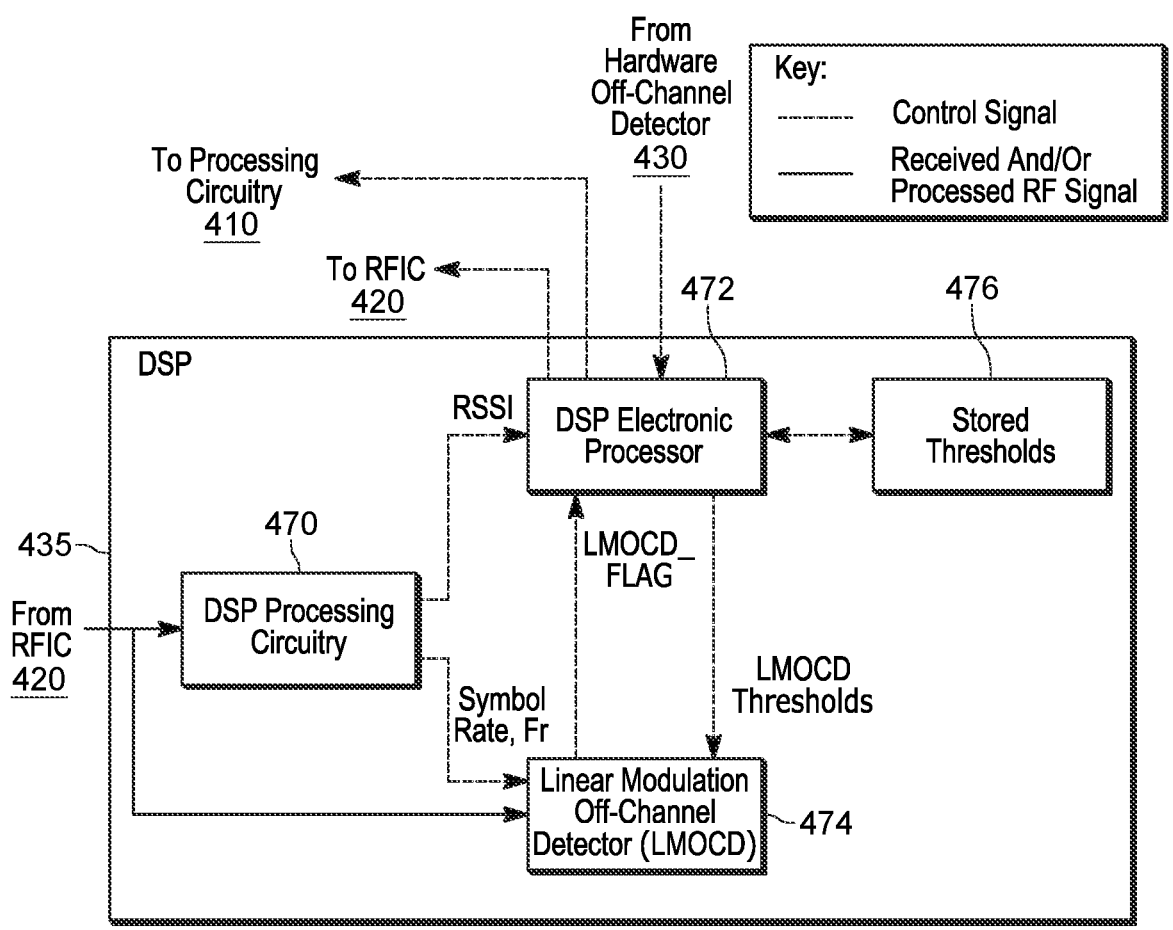
FIG. 4D is a signal flow diagram of elements of a digital signal processor (DSP) of the communication device of FIG. 2 that allow for automatic gain control based on a processed complex baseband signal from a received RF signal according to one embodiment.

FIG. 4D is a signal flow diagram of elements of the DSP 435 of the communication device 200 that allow for automatic gain control based on the processed complex baseband signal 425 according to one embodiment. In some embodiments, the DSP 435 includes DSP processing circuitry 470 that is configured to receive the processed complex baseband signal 425 from the RFIC 420. In some embodiments, the DSP processing circuitry 470 is configured to determine a received signal strength indication (RSSI) of a desired RF signal that forms at least part of the processed complex baseband signal 425. The RSSI may be calculated as the sum of the square of the magnitude of complex baseband samples multiplied with a calibrated gain and a variable gain that is determined based on a total amount of instantaneous attenuation applied along the receiving signal path. In some embodiments, suitable filtering may be applied to the processed complex baseband signal 425 prior to RSSI calculation to ensure that only the desired RF signal is selected. The DSP processing circuitry 470 may be configured to transmit data indicative of the RSSI of the desired signal to a DSP electronic processor 472. Alternatively, the DSP electronic processor 472 may receive the processed complex baseband signal 425 and may determine the RSSI of the desired signal that forms at least part of the processed complex baseband signal 425.

In some embodiments, the DSP electronic processor 472 is configured to receive the output of the hardware off-channel detector 430 that indicates the power level of the processed RF signal 415. Additionally, the DSP electronic processor 472 may be configured to provide outputs to the processing circuitry 410 and to the RFIC 420 to respectively control the external attenuator switch 446 and the internal attenuator switch 456 as explained in greater detail below.

In some embodiments, the DSP 435 also includes a linear modulation off-channel detector (LMOCD) 474 that is also configured to receive the processed complex baseband signal 425 from the RFIC 420. In some embodiments, the LMOCD 474 is implemented by the DSP 435 running certain software/firmware to carry out the functions of the LMOCD 474. In other words, while the LMOCD 474 is shown as a separate block in FIG. 4D, the LMOCD 474 may be a portion of software/firmware stored in the memory 306 and executed by the DSP electronic processor 472 and/or the electronic processor 300.

In some embodiments, the LMOCD 474 is also configured to receive a symbol rate from the DSP processing circuitry 470 directly or via the DSP electronic processor 472/electronic processor 300. For example, in different geographical regions, different types of interferer signals of different symbol rates may be present. However, each type of interferer signal may not be known at the time of manufacturing of the communication device 200. Accordingly, each symbol rate may not be initially stored in the memory 306 at the time of manufacturing of the communication device 200. In some embodiments, interferer signal information (e.g., one or more symbol rates) may be transmitted to the communication device 200 (e.g., from a cloud server) through one of the communication towers 110-113 after manufacturing of the communication device 200 and when the communication device 200 is being used in the field. In some embodiments, this interferer signal information may be manually entered into the communication device 200 by a user, a service technician, or the like. This interferer signal information may be stored in the memory 306 to be used to detect additional types of interferer signals at additional symbol rates that were not initially saved in the memory 306 at the time of manufacturing of the communication device 200.

In some embodiments, the LMOCD 474 is configured to determine a modulation type of an interferer signal that forms at least part of the processed complex baseband signal 425. In some embodiments, the modulation type is determined based on detection of or lack of detection of distortion terms in a frequency spectrum of the processed complex baseband signal 425 at frequencies corresponding to integer multiples (e.g., positive and negative integer multiples) of the symbol rate of a linear modulation interferer as explained in greater detail below. In some embodiments, the LMOCD 474 is configured to determine whether the processed complex baseband signal 425 includes a linear modulation interferer signal having a second order intermodulation distortion (IM2) distortion-to-noise ratio above a predetermined threshold. In some embodiments, the LMOCD 474 is configured to determine whether an interferer signal present in the processed complex baseband signal 425 is a constant envelope (CE) interferer signal or a linear modulation interferer signal.

In some embodiments, the LMOCD 474 is configured to generate a LMOCD_FLAG that indicates whether the processed complex baseband signal 425 includes a linear modulation interferer signal. In some embodiments, to determine a value for the LMOCD_FLAG, the LMOCD 474 utilizes LMOCD thresholds that are stored on the communication device 200 (e.g., in the memory 306). The functionality of the LMOCD 474 is explained in greater detail below with respect to FIG. 4E.

Although the elements of the DSP 435 are shown separately in FIG. 4D, in some embodiments, one or more of the elements are included in a single element and/or in other elements of the communication device 200. For example, at least one of the DSP processing circuitry 470 and the LMOCD 474 may be part of and/or may be implemented on the DSP electronic processor 472, which may be part of and/or may be implemented on the electronic processor 300. As another example and as noted above, stored thresholds 476 may be stored on the memory 306 of the communication device 200.

Figure 4E:
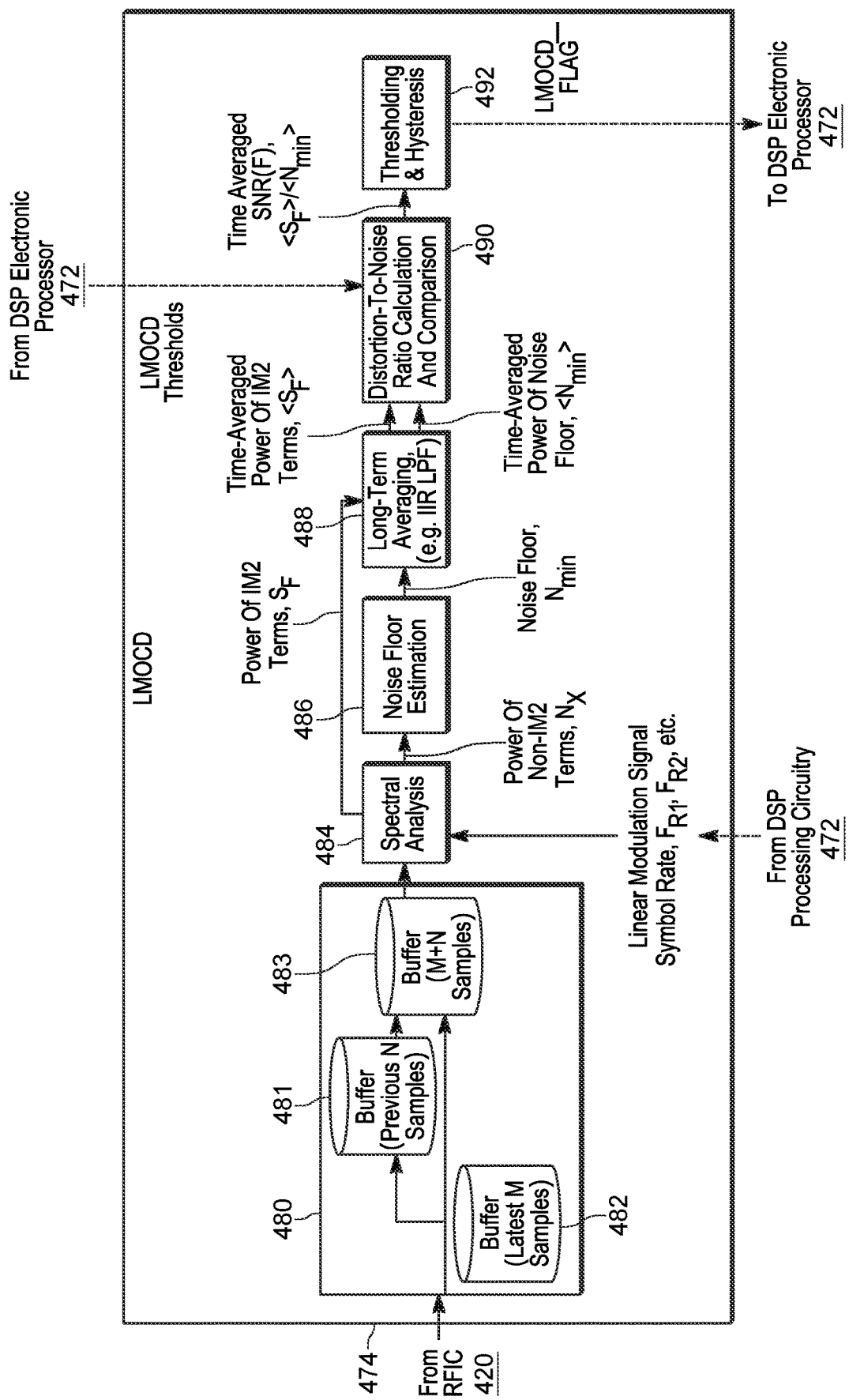
FIG. 4E is a signal flow diagram of elements of a linear modulation off-channel detector (LMOCD) of the DSP of FIG. 4D that allow for signal processing of the processed complex baseband signal to determine whether a linear modulation interferer signal is present according to one embodiment.

FIG. 4E is a signal flow diagram of the elements of the LMOCD 474 of the DSP 435 that allow for signal processing of the processed complex baseband signal 425 to determine whether a linear modulation interferer signal is present according to one embodiment. In some embodiments, the LMOCD 474 is configured to determine whether a linear modulation interferer signal is present by performing a spectral analysis of the processed complex baseband signal 425 in the frequency domain to attempt to detect known interferer signals (e.g., APCO LSM interferer signals, HDQPSK interferer signals, and/or the like) at known symbol rate tones as explained in detail below.

In some embodiments, the LMOCD 474 includes a concatenator 480 that includes a first buffer 481, a second buffer 482, and a third buffer 483. The first buffer 481 may be configured to buffer/store a first plurality of previous time domain samples of the processed complex baseband signal 425. The second buffer 482 may be configured to buffer/store a second plurality of time domain samples of the processed complex baseband signal 425. The second plurality of time domain samples may be received after the first plurality of previous time domain samples. The third buffer 483 may receive the first plurality of previous time domain samples from the first buffer 481 and the second plurality of time domain samples from the second buffer 482. In some embodiments, the third buffer 483 is configured to concatenate the first plurality of previous time domain samples and the second plurality of time domain samples to generate a group of time domain samples of the processed complex baseband signal 425. The group of time domain samples may be concatenated into the order in which they were received (i.e., in sequence). In some embodiments, the use of the buffers 481, 482, 483 provides sufficient time domain samples of the processed complex baseband signal 425 to allow the LMOCD 474 to perform a fast Fourier transform (FFT) by using some time domain samples from a previous iteration of the processed complex baseband signal 425 and some time domain samples from the current iteration of the processed complex baseband signal 425. Although three buffers 481, 482, 483 are shown in FIG. 4E, in some embodiments, additional or fewer buffers may be included in the concatenator 480.

In some embodiments, at block 484, the LMOCD 474 performs a spectral analysis to transform the concatenated time-domain samples to the frequency domain/spectrum. For example, the LMOCD 474 performs an FFT. In some embodiments, as part of the spectral analysis block 484, the LMOCD 474 also calculates a distortion term power of each of a plurality of distortion terms (e.g., second order intermodulation distortion (IM2) distortion terms) at frequencies corresponding to positive and negative integer multiples of symbol rates (FR) of one or more known linear modulation interferer signals (e.g., APCO LSM, HDQPSK, TETRA with QPSK, and the like). The LMOCD 474 may also calculate a noise power of among frequency bins associated with different frequency ranges not occupied by the distortion terms.

Figure 5A:
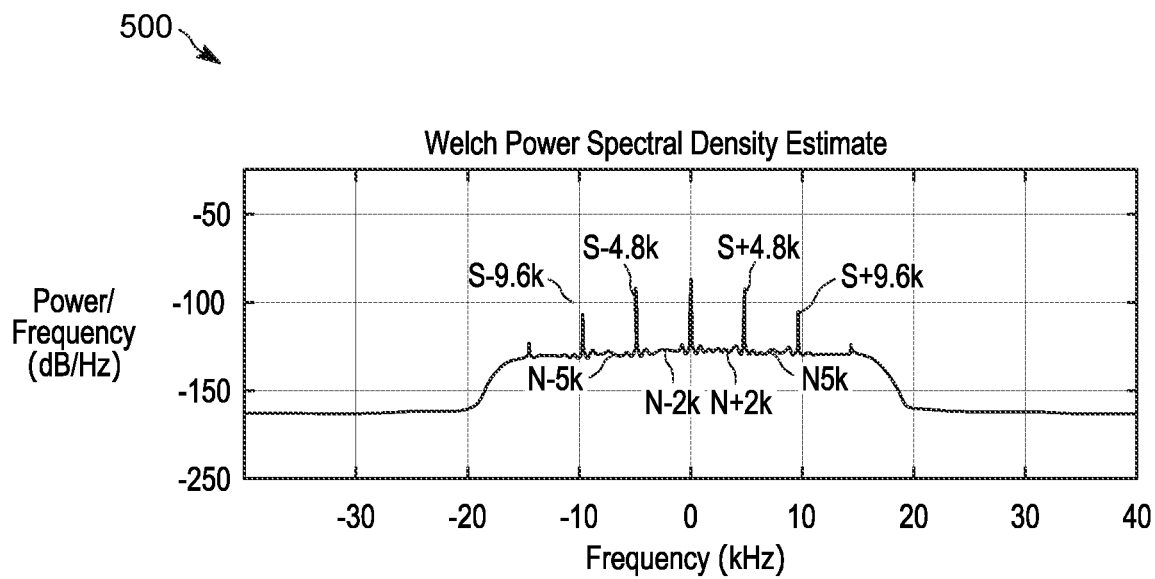
FIG. 5A illustrates a graph of a power spectral density estimate of an example linear modulation interferer signal according to one embodiment.

For example, the symbol rate of an APCO LSM linear modulation interferer signal is known to be 4.8 kilohertz (kHz), and the LMOCD 474 may be configured to detect whether an APCO LSM linear modulation interferer signal is present in the processed complex baseband signal 425. Continuing this example, FIG. 5A illustrates a graph 500 of a power spectral density estimate of an APCO LSM linear modulation interferer signal. As shown in FIG. 5A, the IM2 distortion terms ($S_F$ where $F=\pm mF_R$) correspond to the symbol rates of the linear modulation interferer signal to be detected. For example, when the symbol rate (FR) is 4.8 kHz because the LMOCD 474 is configured to detect an APCO LSM linear modulation interferer signal, the distortion terms ($S_F$) are located at ±4.8 kHz, ±9.6 kHz, ±14.4 kHz, etc. as shown in FIG. 5A. FIG. 5A also shows frequency bins associated with different frequency ranges not occupied by the distortion terms. Continuing the above example, these frequency bins ($N_x$) are located at ±2 kHz, ±5 kHz, ±8 kHz, etc. as shown in FIG. 5A. In some embodiments, the frequency bins associated with different frequency ranges not occupied by the distortion terms may be referred to as noise frequency bins ($N_x$).

Figure 5B:
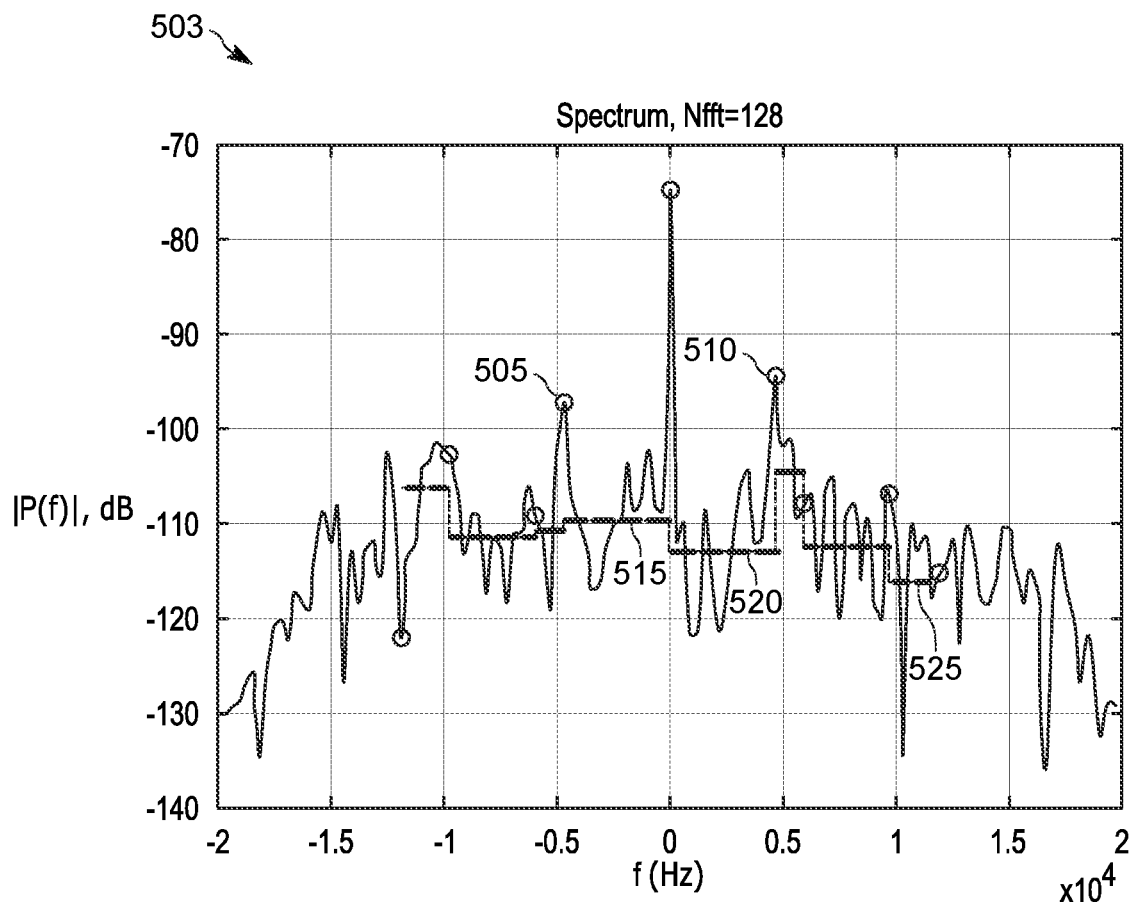
FIG. 5B illustrates an example spectral analysis graph that shows distortion term power estimates and average noise power estimates according to one embodiment.

In some embodiments as mentioned above, the LMOCD 474 is configured to (i) calculate a distortion term power of each of the distortion terms and (ii) calculate a noise power among each of the frequency bins associated with different frequency ranges not occupied by the distortion terms. In some embodiments, the LMOCD 474 calculates an average power of numerous frequencies within each noise frequency bin over a frequency band centered within each noise frequency bin to provide an estimated noise power level in each frequency bin between the distortion terms. For example, FIG. 5B shows distortion term power estimates and average noise power estimates in one example spectral analysis graph 503 that may be generated by the LMOCD 474. In FIG. 5B, points 505 and 510 may indicate a power estimate for the distortion terms at −4.8 kHZ and +4.8 kHz, respectively. Also in FIG. 5B, portions 515 and 520 of a dashed line may indicate the average noise power in frequency bins between distortion terms (e.g., between −4.8 kHz and 0 kHz and between 0 kHz and +4.8 kHz, respectively).

Returning to FIG. 4E, in some embodiments, at block 486, the LMOCD 474 performs a noise floor estimation to determine a minimum noise power level among all of the noise frequency bins whose power level has been calculated. This minimum noise power level may be used as the noise floor for the portion of the processed complex baseband signal 425 being analyzed. Referring back to the example of FIG. 5B, the noise floor estimate (i.e., minimum noise power level) may be identified at a portion 525 of the dashed line at approximately −116 dB. In some embodiments, use of the noise floor estimate avoids overestimation of the noise power in the presence of desired RF signal or other interferers in close proximity to the desired frequency range of the desired RF signal.

Returning to FIG. 4E, in some embodiments, at block 488, the LMOCD 474 performs long-term averaging of the distortion term power of each of the distortion terms and of the noise floor estimate. For example, the LMOCD 474 performs filtering/signal processing using an infinite impulse response (filter), a low-pass filter (LPF), and/or the like. As shown in FIG. 4E, block 488 produces a time-averaged power of the IM2 distortion terms and a time-averaged power of the noise floor estimate. In some embodiments, the distortion power and/or the noise floor power may be averaged either in linear scale or logarithmic scale. The averaged terms have lesser fluctuation over time than non-averaged terms. Accordingly, the averaged terms may produce a more stable decision that holds longer and prevents frequent toggling between detection of the presence and the absence of linear modulation interferer signal.

In some embodiments, at block 490, the LMOCD 474 is configured to calculate a distortion-to-noise ratio by dividing the time-averaged power of the IM2 distortion terms by the time-averaged power of the noise floor estimate. In some embodiments, the LMOCD 474 is configured to calculate a distortion-to-noise ratio by dividing a distortion term power of each of the distortion terms by the power of the noise floor estimate. In some embodiments, at block 490, the LMOCD 474 is configured to compare the distortion-to-noise ratio to a predetermined threshold (i.e., a LMOCD threshold such as a LMOCD_FLAG on threshold). In some embodiments, the predetermined threshold is received by the LMOCD 474 from the DSP electronic processor 472 which may retrieve the predetermined from the stored thresholds 476 (see FIG. 4D).

In some embodiments, the DSP electronic processor 472 is configured to use and/or retrieve a first value (e.g., 25 dB) for the predetermined threshold in response to the internal attenuator 458 and the external attenuator 444 are both disabled. In some embodiments, the DSP electronic processor 472 is configured to use and/or retrieve a second value (15 dB) for the predetermined threshold that is different than the first value in response to at least one of the internal attenuator 458 and the external attenuator 444 being enabled. In other words, different values for the predetermined threshold may be used and/or retrieved depending on whether the attenuators 444, 458 are enabled because the processed complex baseband signal 425 will be weaker when at least one of the attenuators 444, 458 is enabled than when neither one of the attenuators 444, 458 is enabled. For example, if the external attenuator 444 applies 10 dB of attenuation, the DSP electronic processor 472 may adjust the predetermined threshold used to detect a linear modulation interferer signal as appropriate (e.g., by decreasing the predetermined threshold by 10 dB) to ensure that the presence or absence of a linear modulation interferer signal will be accurately detected. In some embodiments, instead of using a single predetermined threshold, the DSP electronic processor 472 may include a first predetermined threshold (i.e., a LMOCD_FLAG on threshold) used to detect a linear modulation interferer signal and a second predetermined threshold (i.e., a LMOCD_FLAG off threshold) used to detect the absence of a linear modulation interferer signal. In some embodiments, the second predetermined threshold is lower than the first predetermined threshold to prevent frequent toggling between detecting the presence and absence of a linear modulation interferer signal.

In some embodiments, the LMOCD 474 is configured to determine whether the modulation type of the interferer signal is linear modulation based on comparing distortion-to-noise ratio pairs of positive and negative complex baseband frequency components in the frequency domain of the processed complex baseband signal 425 to be exceeding the predetermined threshold. In other words, the LMOCD 474 may determine that the modulation type of the interferer signal is linear modulation in response to detecting distortion-to-noise ratio pairs of positive and negative complex baseband frequency components in the frequency domain to be exceeding the predetermined threshold. Alternatively, the LMOCD 474 may determine that the modulation type of the interferer signal is not linear modulation (and for example, is constant envelope) in response to detecting the distortion-to-noise ratio pairs of positive and negative complex baseband frequency components in the frequency domain to be less than the predetermined threshold (i.e., by detecting a lack of strength of the distortion terms in the frequency spectrum of the processed complex baseband signal 425).

In some embodiments, at block 492, the LMOCD 474 determines whether to enable a LMOCD_FLAG that indicates that a linear modulation interferer signal is present in the processed complex baseband signal 425. To do so, the LMOCD 474 may take into account different thresholds and hysteresis of the processed complex baseband signal 425 using a method 600 shown in FIG. 6. In some embodiments, blocks 490 and 492 of FIG. 4E are combined.

Figure 6:
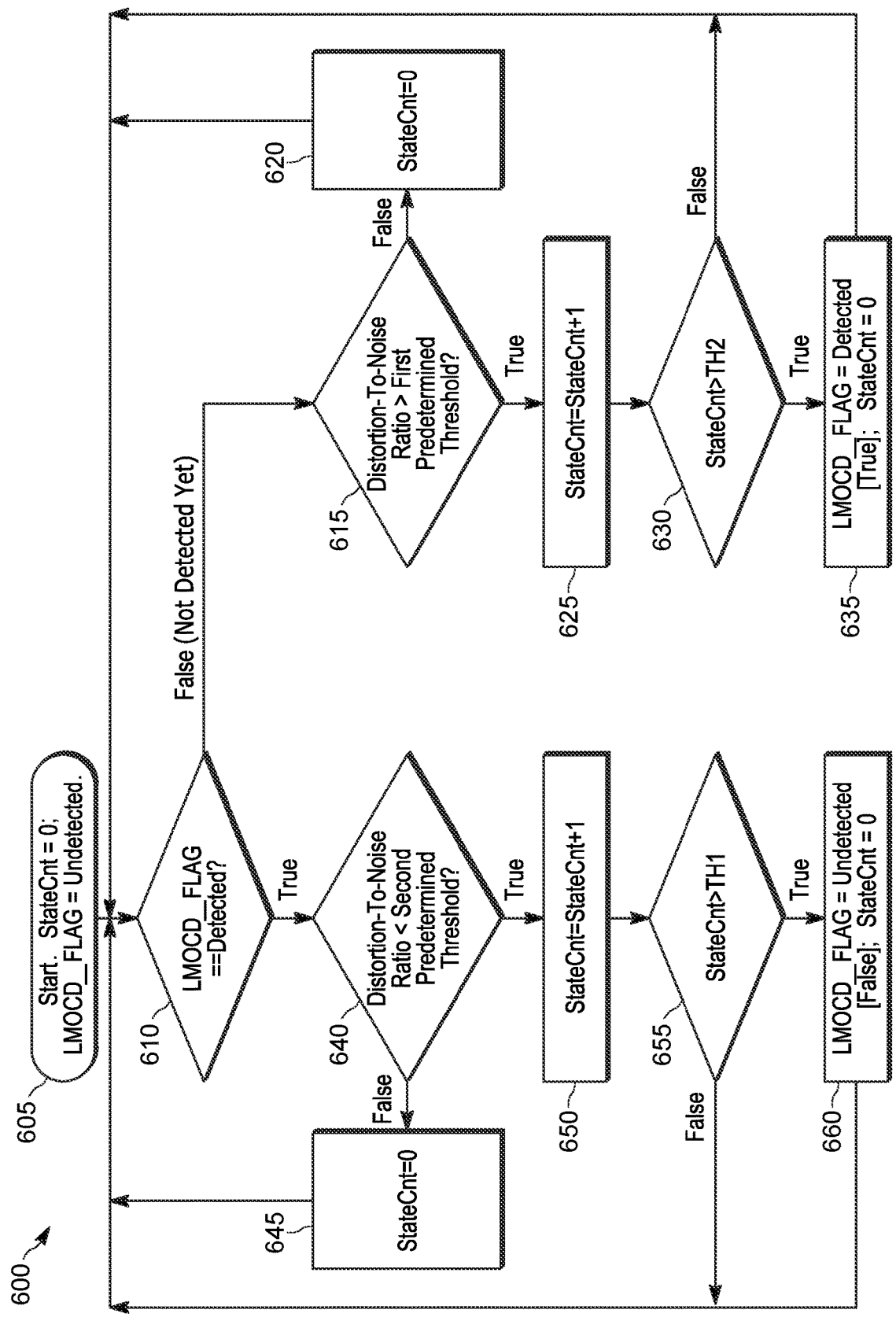
FIG. 6 is a flow chart of a sub-method of actions performed by a portion of the LMOCD of FIG. 4E to determine whether a LMOCD_FLAG should be enabled/detected or disabled/undetected according to one embodiment.
Figure 7:
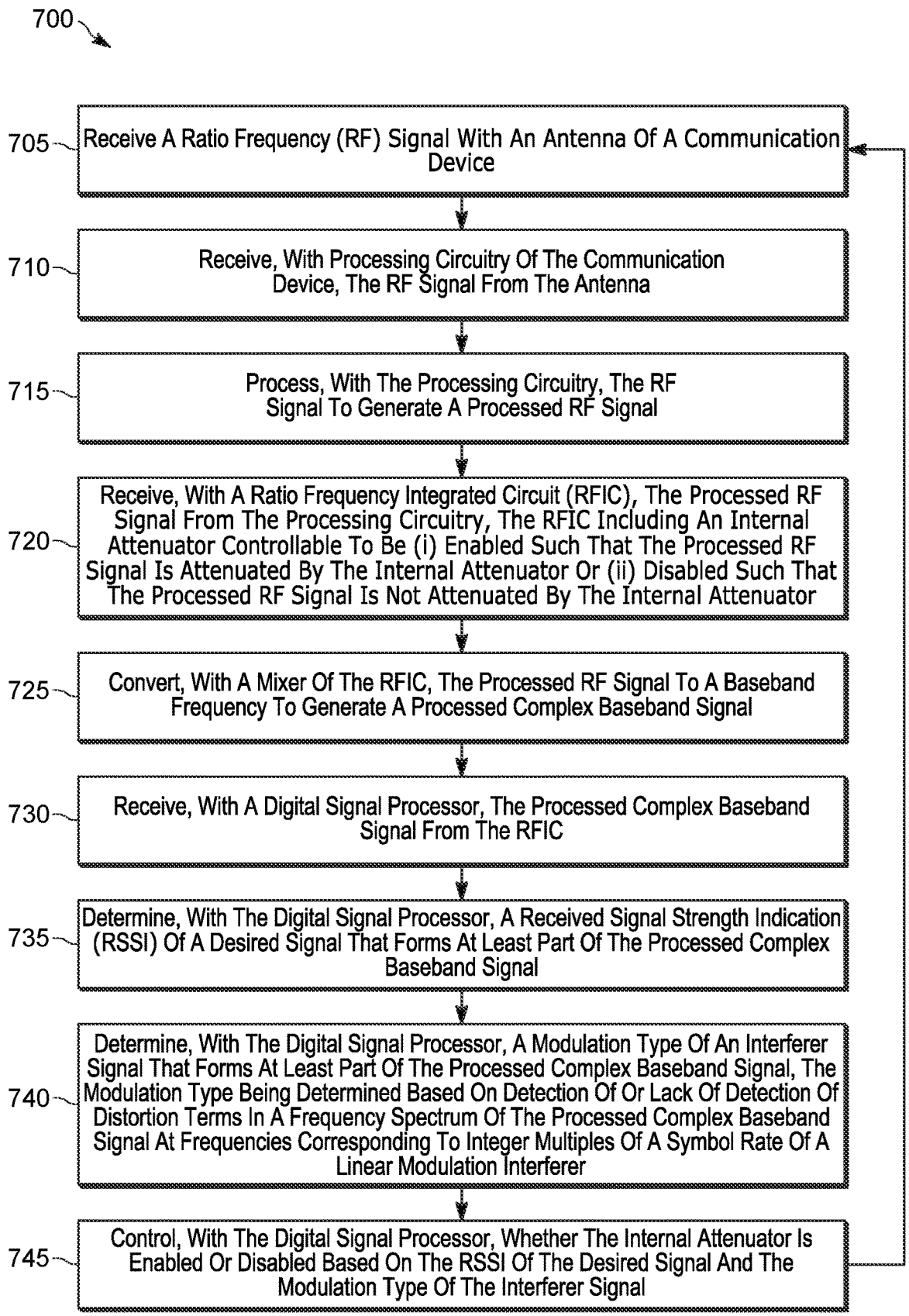
FIG. 7 is a flowchart of a method of controlling at least one signal attenuator of the communication device of FIG. 2 using automatic gain control according to one embodiment.
Figure 8:
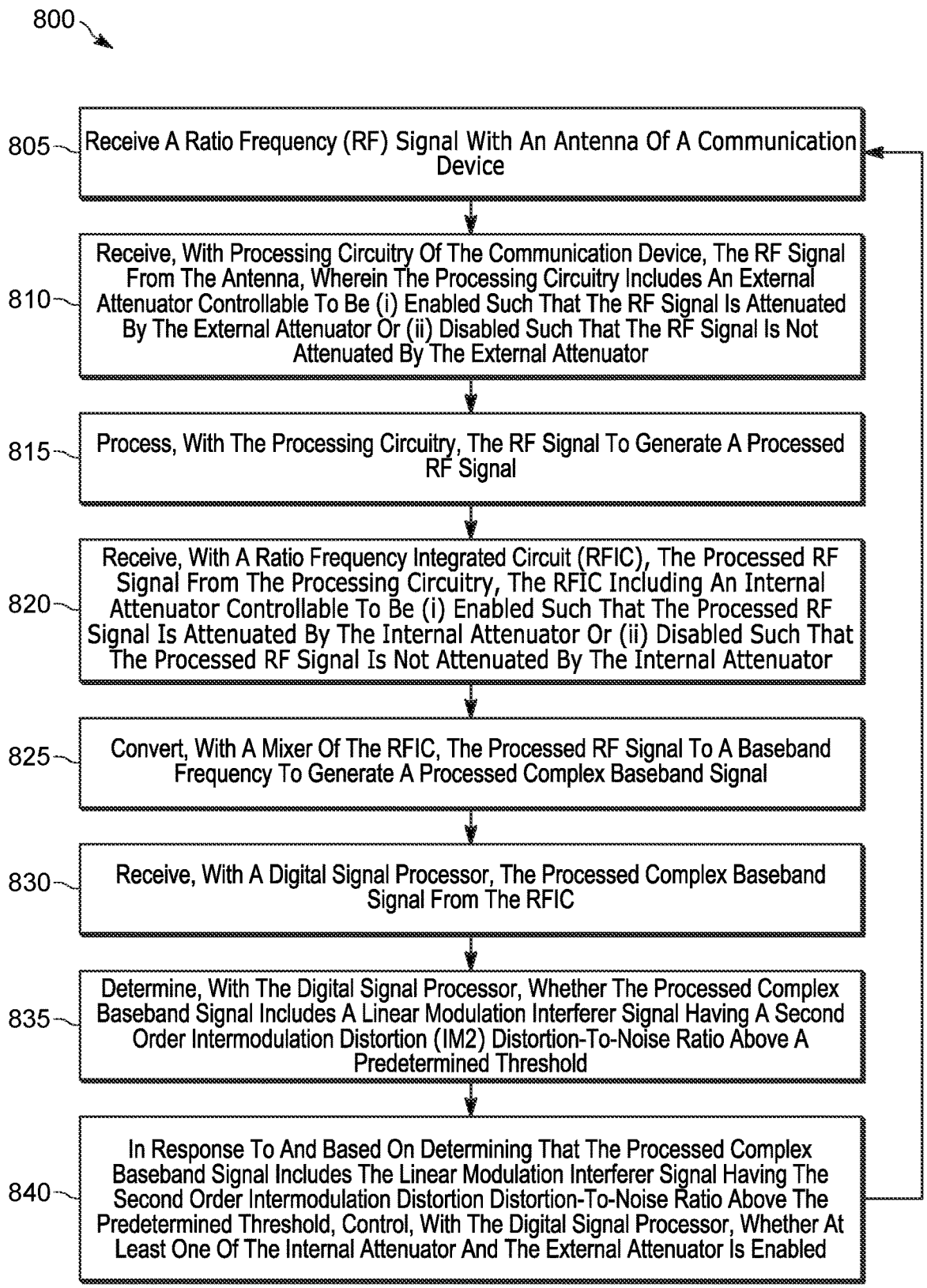
FIG. 8 is a flowchart of another method of controlling at least one signal attenuator of the communication device of FIG. 2 using automatic gain control according to one embodiment.

FIG. 6 is a flow chart of a sub-method of the actions performed in block 490 and/or block 492 of FIG. 4E to determine whether the LMOCD_FLAG should be enabled/detected or disabled/undetected. As noted above, when the LMOCD_FLAG is enabled, the LMOCD_FLAG indicates that a linear modulation interferer signal is present in the processed complex baseband signal 425. On the other hand, when the LMOCD_FLAG is disabled, the LMOCD_FLAG indicates that a linear modulation interferer signal is not present in the processed complex baseband signal 425 (which indicates that the noise present in the processed complex baseband signal 425 may merely be a constant envelope interferer signal). One of the goals of performing the method 600 is to determine whether a linear modulation interferer signal is present in the processed complex baseband signal 425 while avoiding frequent decision toggling of detecting its presence and its absence. In other words, analysis of multiple consecutive sets of samples may be required before the LMOCD 474 detects a change in state of the LMOCD_FLAG from detecting a linear modulation interferer signal to detecting the absence of a linear modulation interferer signal and vice versa.

At block 605, the method 600 is initiated. When the method 600 is initiated (e.g., upon receiving first buffered samples of a received signal), a value of a state count variable (stateCnt) is set to zero and the LMOCD_FLAG is set to be disabled/undetected. At block 610, the LMOCD 474 determines whether the LOMCD_FLAG is enabled/detected. The first time that the method 600 is executed the LMOCD_FLAG will be undetected based on the above-noted initiation process at block 605. Accordingly, the method 600 will proceed to block 615.

At block 615, the LMOCD 474 determines whether the distortion-to-noise ratio for the time period of samples being analyzed is greater than the predetermined threshold (e.g., a LMOCD threshold) explained above. In other words, the LMOCD 474 may compare distortion-to-noise ratio pairs of positive and negative complex baseband frequency components of a plurality of groups of samples of the processed complex baseband signal 425 in the frequency domain to the predetermined threshold (e.g., a LMOCD_FLAG on threshold, which may be referred to as a first predetermined threshold). In response to determining that the distortion-to-noise ratio for the time period of samples being analyzed is less than the predetermined threshold (i.e., a linear modulation interferer signal is not present), the LMOCD 474 sets the state count to zero (at block 620) and proceeds back to block 610 to re-execute most blocks of the method 600. In other words, method 600 proceeds to blocks 620 and 610 in response to the LMOCD 474 determining that the modulation type of the interferer signal for each group of samples is not linear modulation in response to detecting the distortion-to-noise ratio pairs of positive and negative complex baseband frequency components in the frequency domain for the respective group of samples to be less than the predetermined threshold (e.g., the LMOCD_FLAG on threshold). On the other hand, in response to determining that the distortion-to-noise ratio for the time period of samples being analyzed is greater than the predetermined threshold (i.e., a linear modulation interferer signal is present), the method 600 proceeds to block 625. In other words, the method 600 proceeds to block 625 in response to determining that the modulation type of the interferer signal for each group of samples is linear modulation in response to detecting the distortion-to-noise ratio pairs of positive and negative complex baseband frequency components in the frequency domain for the respective group of samples to be exceeding the predetermined threshold (e.g., the LMOCD_FLAG on threshold).

At block 625, the LMOCD 474 increases the state count by one, and the method proceeds to block 630. At block 630, the LMOCD 474 determines whether the state count is greater than a second state count threshold (TH2). In some embodiments, the second state count threshold is a predetermined threshold that may be programmed at the time of manufacturing of the communication device 200. The second state count threshold may be programmed such that a certain amount of consecutive time must pass with the distortion-to-noise ratio being above the predetermined threshold (at block 615) in order to detect the continued presence of a linear modulation interferer signal in the processed complex baseband signal 425.

In response to determining that the state count is less than the second state count threshold (i.e., that the linear modulation interferer signal has not been detected for a long enough period of time or for a certain amount of samples of the processed complex baseband signal 425), the method 600 proceeds back to block 610 to continue executing most blocks of the method 600. On the other hand, in response to determining that the state count is greater than the second state count threshold (i.e., that the linear modulation interferer signal has been detected for a long enough period of time or for a certain amount of samples of the processed complex baseband signal 425), the method 600 proceeds to block 635. At block 635, the LMOCD 474 sets the LMOCD_FLAG to be enabled/detected and resets that state count to zero. In other words, at block 635, the LMOCD 474 is configured to change a state of the LMOCD_FLAG that indicates whether the modulation type of the interferer signal is linear modulation in response to determining that the modulation type of the interferer signal has been the same for a predetermined amount of consecutive groups of samples of the processed complex baseband signal 425. The method 600 then proceeds back to block 610. As shown in FIG. 4D, the LMOCD 474 may provide the value of the LMOCD_FLAG to the DSP electronic processor 472 for use in controlling the external attenuator 444, the internal attenuator 458, or both as explained in greater detail below.

At block 610, in response to determining that the LMOCD_FLAG is enabled/detected, the method 600 proceeds to block 640. At block 640, the LMOCD 474 determines whether the distortion-to-noise ratio for the time period of samples being analyzed is less than the predetermined threshold explained above. As explained herein, in some embodiments, at block 640 the LMOCD 474 determines whether the distortion-to-noise ratio for the time period of samples being analyzed is less than a second predetermined threshold (e.g., LMOCD_FLAG off threshold) that is different than the first predetermined threshold (e.g., LMOCD_FLAG on threshold) used at block 615. In response to determining that the distortion-to-noise ratio for the time period of samples being analyzed is greater than the predetermined threshold (i.e., a linear modulation interferer signal is still present), the LMOCD 474 sets the state count to zero (at block 645) and proceeds back to block 610 to re-execute most blocks of the method 600. On the other hand, in response to determining that the distortion-to-noise ratio for the time period of samples being analyzed is less than the predetermined threshold (i.e., a linear modulation interferer signal is no longer present), the method 600 proceeds to block 650.

At block 650, the LMOCD 474 increases the state count by one, and the method proceeds to block 655. At block 655, the LMOCD 474 determines whether the state count is greater than a first state count threshold (TH1). In some embodiments, the first state count threshold is a predetermined threshold that may be programmed at the time of manufacturing of the communication device 200. The first state count threshold may be programmed such that a certain amount of consecutive time or must pass with the distortion-to-noise ratio being below the predetermined threshold (at block 640) in order to detect the continued absence of a linear modulation interferer signal in the processed complex baseband signal 425. In some embodiments, the first state count threshold is the same as the second state count threshold. In other embodiments, the first and second state count thresholds are different such that a different consecutive amount of time and/or samples are required to determine the presence of a linear modulation interferer signal than to determine the absence of a linear modulation interferer signal.

In response to determining that the state count is less than the first state count threshold (i.e., that the absence of the linear modulation interferer signal has not been detected for a long enough period of time or for a certain amount of samples of the processed complex baseband signal 425), the method 600 proceeds back to block 610 to continue executing most blocks of the method 600. On the other hand, in response to determining that the state count is greater than the first state count threshold (i.e., that the absence of the linear modulation interferer signal has been detected for a long enough period of time or for a certain amount of samples of the processed complex baseband signal 425), the method 600 proceeds to block 660. At block 660, the LMOCD 474 sets the LMOCD_FLAG to be disabled/undetected and resets that state count to zero. In other words, at block 660, the LMOCD 474 is configured to change a state of the LMOCD_FLAG that indicates whether the modulation type of the interferer signal is linear modulation in response to determining that the modulation type of the interferer signal has been the same (i.e., a linear modulation interferer signal has been absent) for a predetermined amount of consecutive groups of samples of the processed complex baseband signal 425. The method 600 then proceeds back to block 610. As shown in FIG. 4D, the LMOCD 474 may provide the value of the LMOCD_FLAG to the DSP electronic processor 472 for use in controlling the external attenuator 444, the internal attenuator 458, or both as explained in greater detail below.

As indicated by FIG. 6 and the above corresponding explanation, the method 600 ensures that the state of the LMOCD_FLAG does not frequently toggle back and forth between enabled/detected and disabled/undetected. In some embodiments, the method 600 may include time delay blocks (not shown), for example, after blocks 660 and 635 to ensure that a change in the presence or absence of a linear modulation interferer signal has been detected for a sufficient amount of time to switch the state/value of the LMOCD_FLAG.

In some embodiments, the electronic processor 300, the DSP electronic processor 472, or a combination of both executes a state machine to perform automatic gain control of the communication device 200 based on at least one of the RSSI of the desired RF signal and the value/state of the LMOCD_FLAG. For ease of explanation, such control will be explained as being performed by the electronic processor 300. However, such control may be performed by other elements of the communication device 200 (e.g., the DSP electronic processor 472) that may or may not be part of the electronic processor 300. In some embodiments, to perform automatic gain control, the electronic processor 300 controls whether the external attenuator 444 and the internal attenuator 458 are enabled or disabled based on the RSSI of the desired RF signal and based on the value/state of the LMOCD_FLAG as indicated in Table 1 (below).

weak, it may be desirable not to attenuate the received RF signal so as to avoid further reducing the RSSI of the desired signal.

When the RSSI of the desired signal has increased above a first bottom RSSI threshold of the ideal state (e.g., −104 dBm), the communication device 200 may operate in the ideal state. Once the electronic processor 300 switches operation of the communication device 200 to the ideal state, the communication device 200 may continue to operate in the ideal state until either (i) the RSSI of the desired signal increases above a top RSSI threshold of the ideal state (e.g., −89 dBm) or (ii) the RSSI of the desired signal decreases below a second bottom RSSI threshold of the ideal state (e.g., −112 dBm). As indicated in Table 1, a bottom RSSI threshold of the ideal state may be different depending on whether the RSSI of the desired RF signal is increasing or decreasing with respect to previous samples of the received RF signal that have been analyzed/processed. Similarly, the top RSSI threshold of the ideal state may be different depending on whether the RSSI of the desired RF signal is increasing or decreasing.

In some embodiments, in the ideal state, the electronic processor 300 is configured to control at least one of the attenuators 444, 458 based on a value/state the LMOCD_FLAG as determined by the LMOCD 474 as explained above. For example, in response to determining that the LMOCD_FLAG is enabled/detected (i.e., that the presence of a linear modulation interferer signal has been detected for a certain amount of time or for a certain amount of consecutive groups of samples), the electronic processor 300 is configured to disable the external attenuator 444 and enable the internal attenuator 458. On the other hand, in response to

TABLE 1

| Transition Tigger Between States | | | | | |
|---|---|---|---|---|---|
| RSSI change direction | RSSI change | Bottom RSSI threshold | Top RSSI threshold | Destination State | Action(s) in Destination State |
| Dropping RSSI | Δ RSSI < 0 | −infinity dBm | −112 dBm | Weak (W) | external attenuator = OFF internal attenuator = OFF |
| Raising RSSI | Δ RSSI > 0 | −104 dBm | −89 dBm | Ideal (I) | IF LMOCD_FLAG = enabled, then |
| Dropping RSSI | Δ RSSI < 0 | −112 dBm | −97 dBm | | external attenuator = OFF internal attenuator = ON; ELSE external attenuator = OFF internal attenuator = OFF. |
| Raising RSSI | Δ RSSI > 0 | −89 dBm | −26 dBm | Strong (S) | external attenuator = ON internal attenuator = OFF |
| Dropping RSSI | Δ RSSI < 0 | −97 dBm | −34 dBm | | |
| Raising RSSI | Δ RSSI > 0 | −26 dBm | +infinity dBm | Very strong (VS) | external attenuator = ON internal attenuator = ON |

As indicated in table 1, one example state machine implemented by the electronic processor 300 may include four states: weak (W), ideal (I), strong (S), and (VS). These four states may generally correspond to an RSSI of an RF signal (e.g., an RSSI of the desired RF signal that forms at least a part of the processed RF signal 415) received by the communication device 200.

When the RSSI of the desired signal included the received RF signal is less than 112 dBm, the communication device 200 may operate in the weak state where the electronic processor 300 controls both of the attenuators 444, 458 to be off. For example, because the RSSI of the desired signal is determining that the LMOCD_FLAG is disabled/undetected (i.e., that the absence of a linear modulation interferer signal has been detected for a certain amount of time or for a certain amount of consecutive groups of samples) when the RSSI of the desired signal indicates that the communication device 200 is in the ideal state, the electronic processor 300 may be configured to disable both attenuators 444, 458. In other words, the electronic processor 300 may be configured to control the internal attenuator 458 to be enabled in response to determining that (i) the RSSI of the desired signal is above a second RSSI threshold (i.e., a bottom ideal state RSSI threshold) and below a first RSSI threshold (i.e., a top ideal state RSSI threshold which may be the same as a bottom strong state RSSI threshold) and (ii) the modulation type of the interferer signal is linear modulation as indicated by the detection of the distortion terms in the frequency spectrum of the processed complex baseband signal 425 at the frequencies corresponding to the integer multiples of the symbol rate of the linear modulation interferer.

As indicated by Table 1 and the above explanation of operation of the communication device 200 in the ideal state, in some embodiments, the electronic processor 300 is configured to control the external attenuator 444 to be disabled in response to determining that the RSSI of the desired signal is below the first RSSI threshold (i.e., a top ideal state RSSI threshold which may be the same as a bottom strong state RSSI threshold). Accordingly, in some embodiments, when the communication device 200 operates in the ideal state, the electronic processor 300 may control the external attenuator 444 to be disabled regardless of the status/state of the LMOCD_FLAG.

Controlling only the internal attenuator 458 to be enabled when the presence of a linear modulation interferer signal is detected in the ideal state allows the desired RF signal to be more strongly received by the DSP 435 compared to existing control methods that may enable both attenuators 444, 458 or neither attenuator 444, 458 when the RSSI of the desired RF signal corresponds to values in the ideal state of above-noted state machine. Specifically, both attenuators 444, 458 weaken noise signals in the received RF signal to give the communication device 200 more protection, but both attenuators 444, 458 also may weaken the desired RF signal included in the received signal (i.e., desensitization of the communication device 200 to the desired RF signal). While both attenuators 444, 458 may function similarly, by virtue of their respective location within the signal path (see FIGS. 4A-4C where the external attenuator 444 is located further upstream (i.e., closer to the antenna 202) than the internal attenuator 458), the external attenuator 444 may provide more attenuation and more desensitization to the received RF signal than the internal attenuator 458.

Accordingly and as indicated by the example control situations in Table 1, the electronic processor 300 controls the internal attenuator 458 to be enabled first when the RSSI of the desired RF signal is relatively low (in the ideal state) because engaging the external attenuator 444 in this situation may further reduce the already relatively low RSSI of the desired RF signal. However, in some embodiments, the internal attenuator 458 is only enabled in the ideal state in response the LMOCD_FLAG indicating that a linear modulation interferer signal is present in the received RF signal.

When the RSSI of the desired RF signal increases (e.g., in the strong or very strong states), the electronic processor 300 may enable the external attenuator 444 or both the external attenuator 444 and the internal attenuator 458 since the RSSI of the desired RF signal is at a strong or very strong level where attenuation will have less of an impact on desensitization. However, the control situations in Table 1 are merely examples. In other embodiments, at least one of the attenuators 444, 458 may be controlled differently than described above in Table 1.

In some embodiments, enabling and/or disabling attenuators 444, 458 does not necessarily mean a change in state of the attenuator 444, 458. For example, the electronic processor 300 may still be considered to disable the external attenuator 444 even when the external attenuator 444 is currently in the disabled state. In other words, enabling or disabling an attenuator 444, 458 may be synonymous with setting or maintaining a state of an attenuator 444, 458 as enabled or disabled.

With reference back to Table 1, when operating in the ideal state and the RSSI of the desired signal decreases below a second bottom RSSI threshold of the ideal state (e.g., −112 dBm), the communication device 200 may switch back to operating in the weak state as explained previously herein. When operating in the ideal state and the RSSI of the desired RF signal increases above a first top RSSI threshold of the ideal state (i.e., the first RSSI threshold) (e.g., −89 dBm), the communication device 200 may switch to operating in the strong state. In some embodiments, the first top RSSI threshold of the ideal state may correspond to the first bottom RSSI threshold of the strong state. In some embodiments, the communication device 200 remains in the strong state as long as the electronic processor 300 continues to determine that the RSSI of the desired signal is above the first RSSI threshold and below a third RSSI threshold (i.e., a bottom very strong state RSSI threshold which may be the same as a top strong state RSSI threshold). In some embodiments, in the strong state (i.e., in response to determining that the RSSI of the desired signal is above the first RSSI threshold and below the third RSSI threshold), the electronic processor 300 controls the external attenuator 444 to be enabled and controls the internal attenuator 458 to be disabled. Similar to the explanation above with respect to the ideal state, controlling only the external attenuator 444 to be enabled when the communication device 200 is in the strong state allows the desired RF signal to be more strongly received by the DSP 435 compared to existing control methods that may enable both attenuators 444, 458 when the RSSI of the desired RF signal corresponds to values in the strong state of above-noted state machine. For example, in existing communication devices where multiple attenuators are only controllable in unison, such attenuators may all be enabled when the RSSI of the desired signal exceeds a certain threshold even though enabling only one of the attenuators may be sufficient to attenuate the received RF signal. Accordingly, controlling the attenuators 444, 458 individually according to the example states included in Table 1 allows for reduced desensitization, for example, when the communication device 200 is in the strong state as well as the ideal state as explained above. In some embodiments, in the strong state, the control of the attenuators 444, 458 by the electronic processor 300 is not based on the status/state of the LMOCD_FLAG that indicates whether a linear modulation interferer signal is present. Alternatively, in the strong state, the control of the internal attenuator 458 by the electronic processor 300 may be based on the status/state of the LMOCD_FLAG in a similar manner as was previously described with respect to the ideal state.

When operating in the strong state and the RSSI of the desired signal decreases below a second bottom RSSI threshold of the strong state (e.g., −97 dBm), the communication device 200 may switch back to operating in the ideal state as explained previously herein. When operating in the strong state and the RSSI of the desired RF signal increases above a first top RSSI threshold of the strong state (e.g., −26 dBm), the communication device 200 may switch to operating in the very strong state. In some embodiments, the first top RSSI threshold of the strong state may correspond to the bottom RSSI threshold of the very strong state. In some embodiments, in the very strong state, the electronic processor 300 controls both the external attenuator 444 and the internal attenuator 458 to be enabled. In some embodiments, the communication device 200 remains in the very strong state until the RSSI of the desired RF signal decreases below a second top RSSI threshold of the strong state (e.g., −34 dBm).

As indicated in Table 1, one or more of the states of the communication device 200 may include different values for the RSSI thresholds for entry into the state or exit from the state depending on whether the RSSI of the desired RF signal has increased with respect to a previous group of samples of the processed complex baseband signal 425 or has decreased with respect to the previous group of samples of the processed complex baseband signal 425. These different thresholds may help to prevent frequent changes between states that may cause frequent enabling and disabling of the attenuators 444, 458. The threshold values shown in Table 1 are merely examples and may be different in other embodiments. In some embodiments, each state may have one set of values of RSSI thresholds for entry into the state or exit from the state instead of multiple different sets of values depending on whether the RSSI of the desired RF signal is increasing or decreasing as shown in Table 1.

As indicated by Table 1, in some embodiments, the electronic processor 300 is configured to control whether the external attenuator 444 is enabled or disabled based on whether the RSSI of the desired signal (i.e., the desired RF signal) exceeds a first RSSI threshold (i.e., a bottom strong state RSSI level threshold that indicates that the RSSI of the desired signal causes the communication device 200 to operate in the strong state or the very strong state). Table 1 indicates such control of the external attenuator 444 because Table 1 indicates that the external attenuator 444 is off/disabled when the communication device 200 in the ideal and weak states while the external attenuator 444 is on/enabled when the communication device 200 is in the strong and very strong states.

In some embodiments, the communication device 200 performs a method 700 in accordance with the rules and values set forth in Table 1. In some embodiments, at block 705, the communication device 200 receives a radio frequency (RF) signal 405 with the antenna 202 of the communication device 200. At block 710, the processing circuitry 410 of the communication device 200 may receive the RF signal 405 from the antenna 202 (see FIG. 4A). At block 715, the processing circuitry 410 may process the RF signal 405 to generate the processed RF signal 415 (see FIG. 4B). As explained previously herein, in some embodiments, the processing circuitry 410 includes the external attenuator 444 that is controllable to be (i) enabled such that the RF signal 405 is attenuated by the external attenuator 444 or (ii) disabled such that the RF signal 405 is not attenuated by the external attenuator 444.

At block 720, the RFIC 420 of the communication device 200 may receive the processed RF signal 415 from the processing circuitry 410 (see FIG. 4A). As explained previously herein, in some embodiments, the RFIC 420 includes the internal attenuator 458 that is controllable to be (i) enabled such that the processed RF signal 415 is attenuated by the internal attenuator 458 or (ii) disabled such that the processed RF signal 415 is not attenuated by the internal attenuator 458. At block 725, the RFIC 420 may convert, with the mixer 462 and other components of the RFIC 420, the processed RF signal 415 to a baseband frequency to generate the processed complex baseband signal 425 (see FIG. 4C).

At block 730, the DSP 435 may receive the processed complex baseband signal 425 from the RFIC 420 (see FIG. 4A). At block 735, the DSP 435 (e.g., the electronic processor 300 and/or the DSP electronic processor 472 as explained previously herein) may determine a RSSI of a desired signal (e.g., a desired RF signal) that forms at least part of the processed complex baseband signal 425 (see FIG. 4D).

At block 740, the DSP 435 (e.g., the electronic processor 300, the DSP electronic processor 472, and/or the LMOCD 474 as explained previously herein) may determine a modulation type of an interferer signal that forms at least part of the processed complex baseband signal 425 (see FIG. 4E). In some embodiments, the modulation type is determined based on detection of or lack of detection of distortion terms in a frequency spectrum of the processed complex baseband signal 425 at frequencies corresponding to integer multiples of a symbol rate of a linear modulation interferer as explained previously herein.

At block 745, the DSP 435 (e.g., the electronic processor 300, the DSP electronic processor 472, and/or the LMOCD 474 as explained previously herein) may control whether the internal attenuator 458 is enabled or disabled based on the RSSI of the desired signal and the modulation type of the interferer signal. The DSP 435 may also control whether the external attenuator 444 is enabled or disabled based on at least the RSSI of the desired signal as explained previously herein (see Table 1).

In some embodiments, the communication device 200 additionally or alternatively performs a method 800 in accordance with the rules and values set forth in Table 1. In some embodiments, at block 805, the communication device 200 receives a radio frequency (RF) signal 405 with the antenna 202 of the communication device 200. At block 810, the processing circuitry 410 of the communication device 200 may receive the RF signal 405 from the antenna 202 (see FIG. 4A). As explained previously herein, in some embodiments, the processing circuitry 410 includes the external attenuator 444 that is controllable to be (i) enabled such that the RF signal 405 is attenuated by the external attenuator 444 or (ii) disabled such that the RF signal 405 is not attenuated by the external attenuator 444. At block 815, the processing circuitry 410 may process the RF signal 405 to generate the processed RF signal 415 (see FIG. 4B).

At block 820, the RFIC 420 of the communication device 200 may receive the processed RF signal 415 from the processing circuitry 410 (see FIG. 4A). As explained previously herein, in some embodiments, the RFIC 420 includes the internal attenuator 458 that is controllable to be (i) enabled such that the processed RF signal 415 is attenuated by the internal attenuator 458 or (ii) disabled such that the processed RF signal 415 is not attenuated by the internal attenuator 458. At block 825, the RFIC 420 may convert, with the mixer 462 and other components of the RFIC 420, the processed RF signal 415 to a baseband frequency to generate the processed complex baseband signal 425 (see FIG. 4C).

At block 830, the DSP 435 may receive the processed complex baseband signal 425 from the RFIC 420 (see FIG. 4A). At block 835, the DSP 435 (e.g., the electronic processor 300 and/or the DSP electronic processor 472 as explained previously herein) may determine whether the processed complex baseband signal 425 includes a linear modulation interferer signal having a second order intermodulation distortion (IM2) distortion-to-noise ratio above a predetermined threshold as explained previously herein (see FIG. 4E).

At block 840, in response to and based on determining that the processed complex baseband signal 425 includes the linear modulation interferer signal having the second order intermodulation distortion distortion-to-noise ratio above the predetermined threshold, the DSP 435 (e.g., the electronic processor 300, the DSP electronic processor 472, and/or the LMOCD 474 as explained previously herein) may control whether at least one of the internal attenuator 458 and the external attenuator 444 is enabled.

In some embodiments, the electronic processor 300 is configured to also take into account the power level of the processed RF signal 415 from the hardware off-channel detector circuit 430 when controlling whether the internal attenuator 458 and/or the external attenuator 444 are enabled or disabled. For example, the electronic processor 300 is configured to receive an indication of the power level of the processed RF signal 415 from the hardware off-channel detector circuit 430. The DSP 435 may be configured to control whether the internal attenuator 458 is enabled or disabled based on the power level of the processed RF signal 415, the RSSI of the desired RF signal, and the modulation type of the interferer signal detected within the processed complex baseband signal 425. For example, referring back to the ideal state values shown in Table 1, the electronic processor 300 may enable the internal attenuator 458 in response to determining that (i) the communication device 200 is in the ideal state, (ii) the LMOCD_FLAG is enabled/detected, and (iii) the hardware off-channel detector circuit 430 has detected a power level of the processed RF signal 415 that is above the predetermined hardware off-channel detector power level threshold.

Figure 9A:
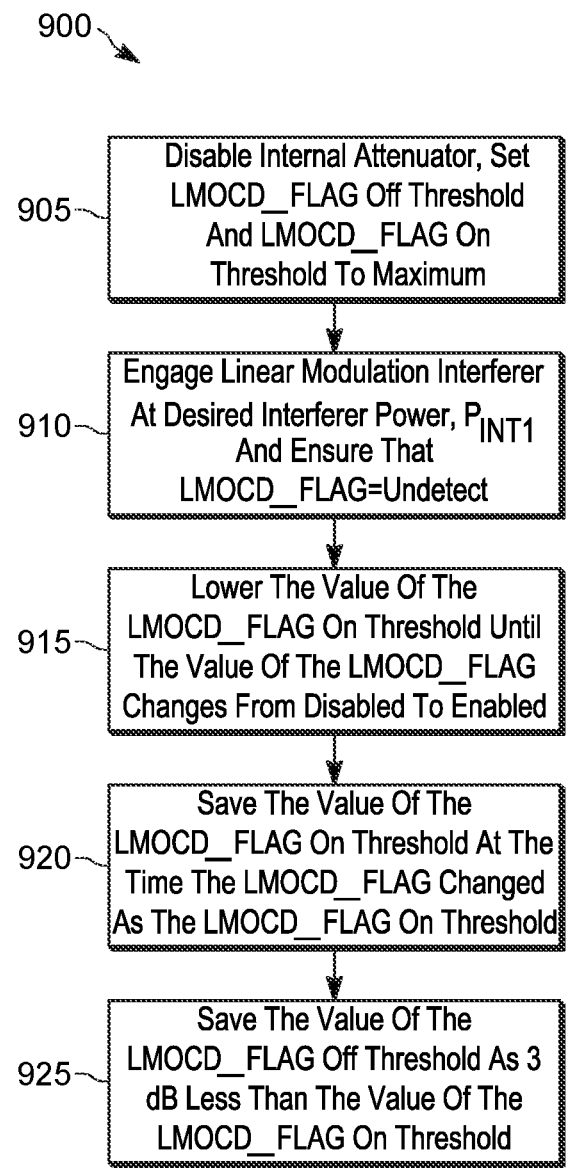
FIGS. 9A and 9B illustrate example methods of determining values of one or more predetermined distortion-to-noise thresholds to be used in different situations according to one embodiment.
Figure 9B:
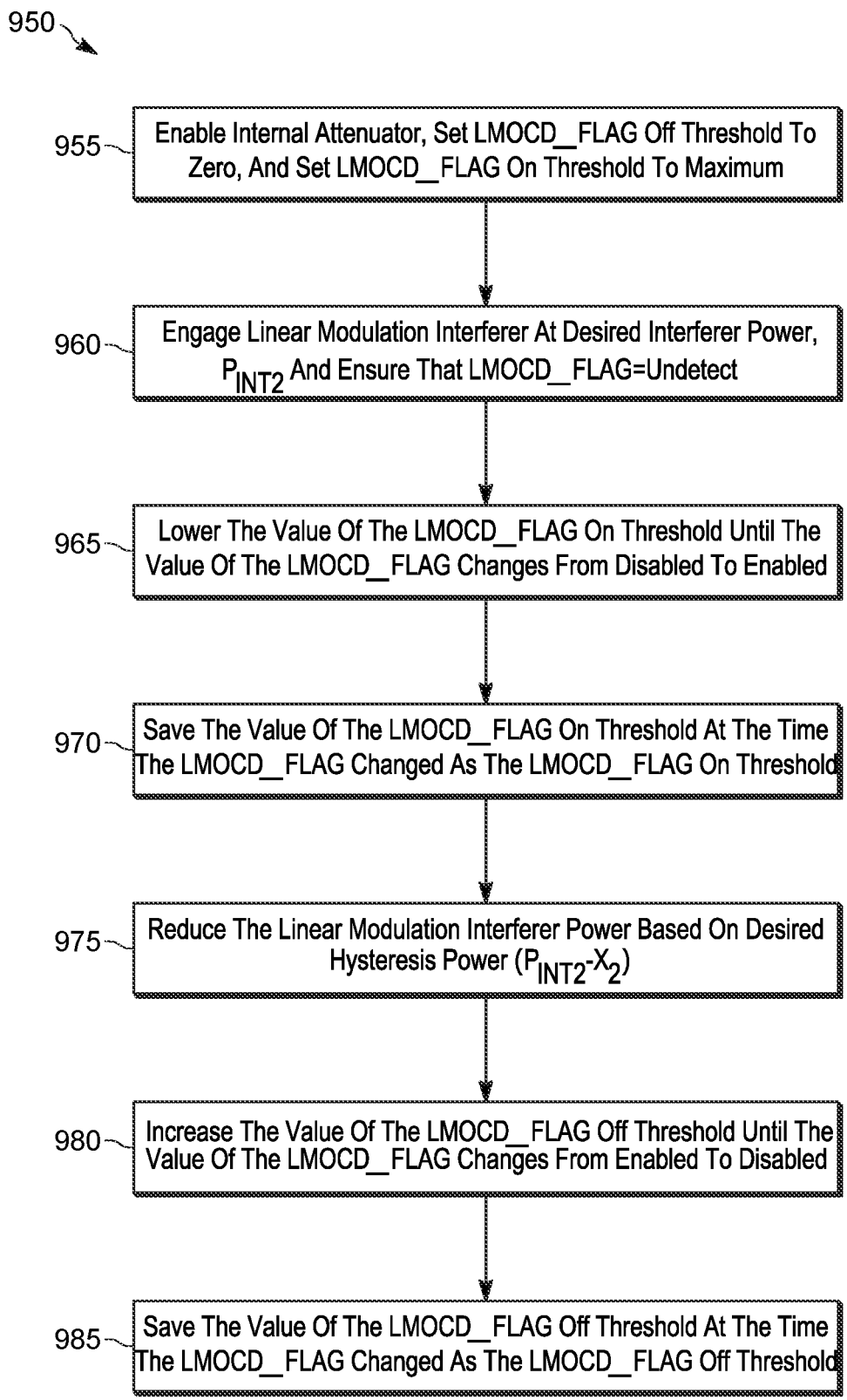

As previously explained herein, the LMOCD 474 may be configured to determine whether the modulation type of the interferer signal is linear modulation based on comparing distortion-to-noise ratio pairs of positive and negative complex baseband frequency components in the frequency domain of the processed complex baseband signal 425 to the predetermined threshold(s) (e.g., LMOCD thresholds that may also be referred to as predetermined distortion-to-noise ratio thresholds). Also as explained previously herein, different values for the predetermined threshold may be used and/or retrieved depending on whether the attenuators 444, 458 are enabled because the processed complex baseband signal 425 will be weaker when at least one of the attenuators 444, 458 is enabled than when neither one of the attenuators 444, 458 is enabled for the same received RF signal. FIGS. 9A and 9B illustrate example methods of determining the values of the predetermined threshold(s) to be used in different situations. In some embodiments, the values calculated during performance of the methods of FIGS. 9A and 9B may be stored in the stored thresholds block 476 of the DSP 435 (which may be a part of the memory 306 of the communication device 200).

FIG. 9A is a flow chart of method 900 of determining a value of the predetermined distortion-to-noise ratio threshold that is used to determine whether the modulation type of the interferer signal is linear modulation when the attenuators 444, 458 are in the disabled/off state. At block 905, the internal attenuator 458 of the communication device 200 is disabled. For example, the communication device 200 may receive a service command from a service device indicating that the electronic processor 300 should disable the internal attenuator 458. In some embodiments, the internal attenuator 458 is disabled to simulate signal strength from the weak state to the ideal state of the communication device 200. In some embodiments, at block 905, the external attenuator 444 is also disabled. Also at block 905, the predetermined distortion-to-noise ratio threshold is initially set to a maximum value. In some embodiments, the communication device 200 includes two predetermined distortion-to-noise ratio thresholds when the attenuators 444, 458 are in the disabled/off state (e.g., a first LMOCD_FLAG off threshold and a first LMOCD_FLAG on threshold). In such embodiments, both thresholds are set to the maximum value at block 905. For example, the service command from the service device may indicate that the above-noted threshold(s) should be set to their maximum value.

In some embodiments, at block 910, a linear modulation interferer signal is generated by an external device (e.g., an RF signal generator) and is received by the communication device 200 as a received RF signal 405 as explained previously herein. In some embodiments, the linear modulation interferer signal is generated at a desired interferer power ($P_{INT1}$). In some embodiments, the desired interferer power is a power at which SINAD performance with or without an attenuator (e.g., the internal attenuator 458) enabled is approximately the same (i.e., a cross-over performance point). When the power of the interferer signal is below the desired interferer power, disabling the internal attenuator 458 will provide better SINAD performance for the desired RF signal than enabling the internal attenuator 458. On the other hand, when the power of the interferer signal is above the desired interferer power, enabling the internal attenuator 458 will provide better SINAD performance for the desired RF signal than disabling the internal attenuator 458. In some embodiments, the desired interferer power ($P_{INT1}$) is determined by varying the interferer power in an RF signal received by the communication device 200 while measuring, for example, SINAD performance to determine whether the SINAD performance is better with the internal attenuator 458 enabled or disabled. As noted above, the desired interferer power ($P_{INT1}$) is the cross-over point where SINAD performance is approximately the same regardless of whether the internal attenuator 458 is enabled or disabled. In some embodiments, the value of the desired interferer power ($P_{INT1}$) is saved in the memory 306 to be used during performance of the method 900.

Upon initial receipt of the linear modulation interferer signal, the electronic processor 300 should control the LMOCD_FLAG to be disabled/undetected because the LMOCD_FLAG on threshold is set to the maximum and will, therefore, not initially detect the linear modulation interferer signal.

At block 915, the value of the LMOCD_FLAG on threshold may be lowered from the maximum value until the LMOCD_FLAG changes from disabled/undetected to enabled/detected. This change indicates that the communication device 200 has detected the linear modulation interferer signal. In some embodiments, the value of the LMOCD_FLAG on threshold immediately after the LMOCD_FLAG changes from disabled/undetected to enabled/detected indicates a desired threshold value at which to detect the desired interferer power ($P_{INT1}$). At block 915, the electronic processor 300 may periodically and gradually lower the value of the LMOCD_FLAG on threshold at predetermined time intervals to ensure that the LMOCD_FLAG has the opportunity to change by the communication device 200 performing the calculations described previously herein.

At block 920, the electronic processor 300 may be configured to save the value of the LMOCD_FLAG on threshold at the time that the LMOCD_FLAG changed from disabled to enabled (i.e., the desired threshold value of the LMOCD_FLAG on threshold) in the memory 306 as the LMOCD_FLAG on threshold for when both of the attenuators 444, 458 are disabled (i.e., the first LMOCD_FLAG on threshold). As indicated by previous explanation herein, the LMOCD_FLAG on threshold may be the distortion-to-noise threshold used by the LMOCD 474 to determine that a linear modulation interferer signal is present in the processed complex baseband signal 425.

In some embodiments, at block 925, the electronic processor 300 saves the value of the LMOCD_FLAG off threshold at three dB lower than the value of the LMOCD_FLAG on threshold saved at block 920. As indicated by previous explanation herein, the LMOCD_FLAG off threshold may be the distortion-to-noise threshold used by the LMOCD 474 to determine that a linear modulation interferer signal is absent in the processed complex baseband signal 425. Also as explained previously herein, in some embodiments, only a single LMOCD_FLAG threshold may be used when the attenuators 444, 458 are disabled. In other words, one of the LMOCD_FLAG on threshold and the LMOCD_FLAG off threshold described above may not be utilized in some embodiments.

FIG. 9B is a flow chart of method 950 of determining a value of the predetermined distortion-to-noise ratio threshold(s) that is/are used to determine whether the modulation type of the interferer signal is linear modulation when at least one of the attenuators 444, 458 are in the enabled/on state. At block 955, the internal attenuator 458 of the communication device 200 is enabled. For example, the communication device 200 may receive a service command from a service device indicating that the electronic processor 300 should enable the internal attenuator 458. In some embodiments, the internal attenuator 458 is enabled to simulate signal strength from the ideal state to the strong state of the communication device 200. In some embodiments, at block 955, the external attenuator 444 is also enabled. Also at block 955, the predetermined distortion-to-noise ratio threshold is initially set to a maximum value. In some embodiments, the communication device 200 includes two predetermined distortion-to-noise ratio thresholds when the attenuators 444, 458 are in the enabled/on state (e.g., a second LMOCD_FLAG off threshold and a second LMOCD_FLAG on threshold). In such embodiments, the LMOCD_FLAG off threshold may be set to zero and the LMOCD_FLAG on threshold may be set to the maximum value at block 955. For example, the service command from the service device may indicate that the above-noted threshold(s) should be set to the values noted above.

In some embodiments, at block 960, a linear modulation interferer signal is generated by an external device (e.g., an RF signal generator) and is received by the communication device 200 as a received RF signal 405 as explained previously herein. In some embodiments, the linear modulation interferer signal is generated at a desired interferer power ($P_{INT2}$). In some embodiments, $P_{INT2}$ may be approximately equal to $P_{INT1}$. In other embodiments, $P_{INT2}$ may be set a few dB away from $P_{INT1}$. In some embodiments, $P_{INT2}$ may be determined in a similar manner as $P_{INT1}$. Upon initial receipt of the linear modulation interferer signal, the electronic processor 300 should control the LMOCD_FLAG to be disabled/undetected because the LMOCD_FLAG on threshold is set to the maximum and will, therefore, not initially detect the linear modulation interferer signal.

At block 965, the value of the LMOCD_FLAG on threshold may be lowered from the maximum value until the LMOCD_FLAG changes from disabled/undetected to enabled/detected. This indicates that the communication device 200 has detected the linear modulation interferer signal. In some embodiments, the value of the LMOCD_FLAG on threshold immediately after the LMOCD_FLAG changes from disabled/undetected to enabled/detected indicates a desired threshold value in which to detect the desired interferer power ($P_{INT2}$). At block 965, the electronic processor 300 may periodically and gradually lower the value of the LMOCD_FLAG on threshold at predetermined time intervals to ensure that the LMOCD_FLAG has the opportunity to change by the communication device 200 performing the calculations described previously herein.

At block 970, the electronic processor 300 may be configured to save the value of the LMOCD_FLAG on threshold at the time that the LMOCD_FLAG changed from disabled to enabled (i.e., the desired threshold value of the LMOCD_FLAG on threshold) in the memory 306 as the LMOCD_FLAG on threshold for when at least one of the attenuators 444, 458 is enabled (i.e., the second LMOCD_FLAG on threshold). As indicated by previous explanation herein, the LMOCD_FLAG on threshold may be the distortion-to-noise threshold used by the LMOCD 474 to determine that a linear modulation interferer signal is present in the processed complex baseband signal 425. As shown in FIGS. 9A and 9B, blocks 910, 915, and 920 of FIG. 9A are similar to blocks 960, 965, and 970 of FIG. 9B.

In some embodiments, blocks 975, 980, and 985 of the method 950 are performed to determine a value of the LMOCD_FLAG off threshold to be saved for use when at least one of the attenuators 444, 458 is enabled (i.e., the second LMOCD_FLAG off threshold). At block 975, a power level of the linear modulation interferer signal generated by the external device and received by the communication device 200 may be reduced from the desired interferer power ($P_{INT2}$). The reduction in the power level of the linear modulation interferer signal may be referred to as a hysteresis power ($X_2$). At this point, the LMOCD_FLAG should still be enabled/detected (i) from block 965 and (ii) because the LMOCD_FLAG off threshold is set to be zero at block 975.

At block 980, the electronic processor 300 may increase the value of the LMOCD_FLAG off threshold until the LMOCD_FLAG changes from the enabled/detected state to the disabled/undetected state. This indicates that the communication device 200 has detected the absence of the linear modulation interferer signal. In some embodiments, the value of the LMOCD_FLAG off threshold immediately after the LMOCD_FLAG changes from enabled/detected to disabled/undetected indicates a desired threshold value in which to detect the absence of the desired interferer power ($P_{INT2}$-$X_2$). At block 980, the electronic processor 300 may periodically and gradually increase the value of the LMOCD_FLAG off threshold at predetermined time intervals to ensure that the LMOCD_FLAG has the opportunity to change by the communication device 200 performing the calculations described previously herein.

At block 985, the electronic processor 300 may be configured to save the value of the LMOCD_FLAG off threshold at the time that the LMOCD_FLAG changed from enabled to disabled (i.e., the desired threshold value of the LMOCD_FLAG off threshold) in the memory 306 as the LMOCD_FLAG off threshold for when at least one of the attenuators 444, 458 is enabled (i.e., the second LMOCD_FLAG off threshold). As indicated by previous explanation herein, the LMOCD_FLAG off threshold may be the distortion-to-noise threshold used by the LMOCD 474 to determine that a linear modulation interferer signal is absent in the processed complex baseband signal 425.

Also as explained previously herein, in some embodiments, only a single LMOCD_FLAG threshold may be used when the attenuators 444, 458 are enabled. In other words, one of the LMOCD_FLAG on threshold and the LMOCD_FLAG off threshold described above may not be utilized in some embodiments.

The methods 900, 950 of determining the values of the predetermined distortion-to-noise ratio threshold(s) may be performed at the time of manufacturing of the communication device 200 to calculate and store thresholds in the memory 306 with respect to numerous different known linear modulation interferer signals (e.g., interferer signals expected based on the type of telecommunication systems allowed by the Federal Communications Commission (FCC) to operate in a particular region and frequency band). Additionally or alternatively, in some embodiments, the methods 900, 950 may be performed after manufacturing of the communication device 200 when the communication device 200 is being used in the field by a user. For example, the methods 900, 950 may be performed in response to user inputs received on the communication device 200 from a field/service agent and/or in response to command received from an external device of the field/service agent. Accordingly, additional thresholds (e.g., corresponding to different expected interferer signals) can be added to the memory 306 using the methods 900, 950 after the communication device 200 has been manufactured. In the field, the method 900 may be executed at a location where a linear modulation interferer is present and its detection is desired corresponding to a desired interferer power ($P_{INT1}$). In the field, the method 950 may be executed at a location where a linear modulation interferer is present and its detection is desired corresponding to a desired interferer power ($P_{INT2}$). Note that $P_{INT1}$ and $P_{INT2}$ may be the same or several dB apart. For example, the location selected is a customer premises where the engagement of the internal step attenuator 458 would improve the SINAD performance of the RF receiver of the communication device 200.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, it should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication device comprising:
an antenna configured to receive a radio frequency (RF) signal;
processing circuitry configured to receive the RF signal from the antenna and process the RF signal to generate a processed RF signal;
a radio frequency integrated circuit (RFIC) configured to receive the processed RF signal, the RFIC including an internal attenuator controllable to be (i) enabled such that the processed RF signal is attenuated by the internal attenuator or (ii) disabled such that the processed RF signal is not attenuated by the internal attenuator, and the RFIC including a mixer configured to convert the processed RF signal to a baseband frequency to generate a processed complex baseband signal; and
a digital signal processor configured to
receive the processed complex baseband signal,
determine a received signal strength indication (RSSI) of a desired signal that forms at least part of the processed complex baseband signal,
perform a spectral analysis to transform the processed complex baseband signal to a frequency spectrum,
determine a modulation type of an interferer signal that forms at least part of the processed complex baseband signal, the modulation type being determined based on detection of or lack of detection of distortion terms in the frequency spectrum of the processed complex baseband signal at frequencies corresponding to integer multiples of a symbol rate of a linear modulation interferer, and
control whether the internal attenuator is enabled or disabled based on the RSSI of the desired signal and the modulation type of the interferer signal.

2. The communication device of claim 1, wherein the processing circuitry includes an external attenuator controllable to be (i) enabled such that the RF signal is attenuated by the external attenuator or (ii) disabled such that the RF signal is not attenuated by the external attenuator; and
wherein the digital signal processor is configured to control whether the external attenuator is enabled or disabled based on whether the RSSI of the desired signal exceeds a first RSSI threshold.

3. The communication device of claim 1, wherein the digital signal processor is configured to control the internal attenuator to be enabled in response to determining that (i) the RSSI of the desired signal is above a second RSSI threshold and below a first RSSI threshold and (ii) the modulation type of the interferer signal is linear modulation as indicated by the detection of the distortion terms in the frequency spectrum of the processed complex baseband signal at the frequencies corresponding to the integer multiples of the symbol rate of the linear modulation interferer.

4. The communication device of claim 3, wherein the processing circuitry includes an external attenuator controllable to be (i) enabled such that the RF signal is attenuated by the external attenuator or (ii) disabled such that the RF signal is not attenuated by the external attenuator; and
wherein the digital signal processor is configured to control the external attenuator to be disabled in response to determining that the RSSI of the desired signal is below the first RSSI threshold.

5. The communication device of claim 3, wherein when the RSSI of the desired signal is above the second RSSI threshold and below the first RSSI threshold, the digital signal processor is configured to control the internal attenuator to be disabled in response to determining that the modulation type of the interferer signal is not linear modulation as indicated by a lack of strength of the distortion terms in the frequency spectrum of the processed complex baseband signal at the frequencies corresponding to the integer multiples of the symbol rate of the linear modulation interferer.

6. The communication device of claim 3, wherein the digital signal processor is configured to control the internal attenuator to be disabled in response to determining that the RSSI of the desired signal is above the first RSSI threshold and below a third RSSI threshold;
wherein the processing circuitry includes an external attenuator controllable to be (i) enabled such that the RF signal is attenuated by the external attenuator or (ii) disabled such that the RF signal is not attenuated by the external attenuator; and
wherein the digital signal processor is configured to control the external attenuator to be enabled in response to determining that the RSSI of the desired signal is above the first RSSI threshold.

7. The communication device of claim 3, wherein at least one of the second RSSI threshold and the first RSSI threshold has a different value depending on whether the RSSI of the desired signal has increased with respect to a previous group of samples of the processed complex baseband signal or has decreased with respect to the previous group of samples of the processed complex baseband signal.

8. The communication device of claim 1, wherein the digital signal processor is configured to determine the modulation type of the interferer signal based on the detection of or the lack of detection of the distortion terms in the frequency spectrum of the processed complex baseband signal at the frequencies corresponding to the integer multiples of the symbol rate of the linear modulation interferer by:
buffering a first plurality of previous samples of the processed complex baseband signal;
receiving a second plurality of samples of the processed complex baseband signal;
concatenating the first plurality of previous samples and the second plurality of samples to generate a group of time-domain samples of the processed complex baseband signal;
performing the spectral analysis to transform the time-domain samples to the frequency spectrum;
calculating a distortion term power of each of the distortion terms;
calculating a noise power among frequency bins associated with different frequency ranges not occupied by the distortion terms;
calculating a distortion-to-noise ratio by dividing the distortion term power of the distortion terms by the noise power;
determining that the modulation type of the interferer signal is linear modulation in response to detecting distortion-to-noise ratio pairs of positive and negative complex baseband frequency components in the frequency spectrum to be exceeding a predetermined threshold; and determining that the modulation type of the interferer signal is not linear modulation in response to detecting the distortion-to-noise ratio pairs of positive and negative complex baseband frequency components in the frequency spectrum to be less than the predetermined threshold.

9. The communication device of claim 1, wherein the digital signal processor is configured to determine the modulation type of the interferer signal based on the detection of or the lack of detection of the distortion terms in the frequency spectrum of the processed complex baseband signal at the frequencies corresponding to the integer multiples of the symbol rate of the linear modulation interferer by:

comparing distortion-to-noise ratio pairs of positive and negative complex baseband frequency components of a plurality of groups of samples of the processed complex baseband signal in the frequency spectrum to a predetermined threshold;

determining that the modulation type of the interferer signal for each group of samples is linear modulation in response to detecting the distortion-to-noise ratio pairs of positive and negative complex baseband frequency components in the frequency spectrum for the respective group of samples to be exceeding the predetermined threshold;

determining that the modulation type of the interferer signal for each group of samples is not linear modulation in response to detecting the distortion-to-noise ratio pairs of positive and negative complex baseband frequency components in the frequency spectrum for the respective group of samples to be less than the predetermined threshold;

changing a state of a flag that indicates whether the modulation type of the interferer signal is linear modulation in response to determining that the modulation type of the interferer signal has been the same for a predetermined amount of consecutive groups of samples of the processed complex baseband signal.

10. The communication device of claim 1, wherein the processing circuitry includes an external attenuator controllable to be (i) enabled such that the RF signal is attenuated by the external attenuator or (ii) disabled such that the RF signal is not attenuated by the external attenuator;

wherein the digital signal processor is configured to determine the modulation type of the interferer signal based on the detection of or the lack of detection of the distortion terms in the frequency spectrum of the processed complex baseband signal at the frequencies corresponding to the integer multiples of the symbol rate of the linear modulation interferer by comparing distortion-to-noise ratio pairs of positive and negative complex baseband frequency components of the processed complex baseband signal in the frequency spectrum to a predetermined threshold; and wherein the digital signal processor is configured to use a first value for the predetermined threshold when the internal attenuator and the external attenuator are both disabled, and use a second value for the predetermined threshold when at least one of the internal attenuator and the external attenuator is enabled, wherein the second value is different than the first value.

11. The communication device of claim 10, further comprising a hardware off-channel detector circuit configured to detect a power level of the processed RF signal;

wherein the digital signal processor configured to
receive an indication of the power level of the processed RF signal from the hardware off-channel detector circuit, and
control whether the internal attenuator is enabled or disabled based on the power level of the processed RF signal, the RSSI of the desired signal, and the modulation type of the interferer signal.

12. A method of controlling a signal attenuator, the method comprising:

receiving a radio frequency (RF) signal with an antenna of a communication device;

receiving, with processing circuitry of the communication device, the RF signal from the antenna;

processing, with the processing circuitry, the RF signal to generate a processed RF signal;

receiving, with a radio frequency integrated circuit (RFIC), the processed RF signal from the processing circuitry, the RFIC including an internal attenuator controllable to be (i) enabled such that the processed RF signal is attenuated by the internal attenuator or (ii) disabled such that the processed RF signal is not attenuated by the internal attenuator;

converting, with a mixer of the RFIC, the processed RF signal to a baseband frequency to generate a processed complex baseband signal;

receiving, with a digital signal processor, the processed complex baseband signal from the RFIC;

determining, with the digital signal processor, a received signal strength indication (RSSI) of a desired signal that forms at least part of the processed complex baseband signal;

performing, with the digital signal processor, a spectral analysis to transform the processed complex baseband signal to a frequency spectrum, determining, with the digital signal processor, a modulation type of an interferer signal that forms at least part of the processed complex baseband signal, the modulation type being determined based on detection of or lack of detection of distortion terms in the frequency spectrum of the processed complex baseband signal at frequencies corresponding to integer multiples of a symbol rate of a linear modulation interferer; and controlling, with the digital signal processor, whether the internal attenuator is enabled or disabled based on the RSSI of the desired signal and the modulation type of the interferer signal.

13. The method of claim 12, wherein the processing circuitry includes an external attenuator controllable to be (i) enabled such that the RF signal is attenuated by the external attenuator or (ii) disabled such that the RF signal is not attenuated by the external attenuator, and further comprising:

controlling, with the digital signal processor, whether the external attenuator is enabled or disabled based on whether the RSSI of the desired signal exceeds a first RSSI threshold.

14. The method of claim 12, wherein controlling whether the internal attenuator is enabled or disabled includes controlling, with the digital signal processor, the internal attenuator to be enabled in response to determining that (i) the RSSI of the desired signal is above a second RSSI threshold and below a first RSSI threshold and (ii) the modulation type of the interferer signal is linear modulation as indicated by the detection of the distortion terms in the frequency spectrum of the processed complex baseband signal at the frequencies corresponding to the integer multiples of the symbol rate of the linear modulation interferer.

15. The method of claim 14, wherein controlling whether the internal attenuator is enabled or disabled includes controlling, with the digital signal processor, the internal attenuator to be disabled in response to determining that the RSSI of the desired signal is above the first RSSI threshold and below a third RSSI threshold;
wherein the processing circuitry includes an external attenuator controllable to be (i) enabled such that the RF signal is attenuated by the external attenuator or (ii) disabled such that the RF signal is not attenuated by the external attenuator, and further comprising controlling, with the digital signal processor, the external attenuator to be enabled in response to determining that the RSSI of the desired signal is above the first RSSI threshold.

16. The method of claim 12, wherein determining the modulation type of the interferer signal based on the detection of or the lack of detection of the distortion terms in the frequency spectrum of the processed complex baseband signal at the frequencies corresponding to the integer multiples of the symbol rate of the linear modulation interferer includes:
buffering, with at least one of an electronic processor and the digital signal processor, a first plurality of previous samples of the processed complex baseband signal;
receiving, with the at least one of the electronic processor and the digital signal processor, a second plurality of samples of the processed complex baseband signal;
concatenating, with the at least one of the electronic processor and the digital signal processor, the first plurality of previous samples and the second plurality of samples to generate a group of time-domain samples of the processed complex baseband signal;
performing, with the at least one of the electronic processor and the digital signal processor, the spectral analysis to transform the time-domain samples to the frequency spectrum;
calculating, with the at least one of the electronic processor and the digital signal processor, a distortion term power of each of the distortion terms;
calculating, with the at least one of the electronic processor and the digital signal processor, a noise power among frequency bins associated with different frequency ranges not occupied by the distortion terms;
calculating, with the at least one of the electronic processor and the digital signal processor, a distortion-to-noise ratio by dividing the distortion term power of the distortion terms by the noise power;
determining, with the at least one of the electronic processor and the digital signal processor, that the modulation type of the interferer signal is linear modulation in response to detecting distortion-to-noise ratio pairs of positive and negative complex baseband frequency components in the frequency spectrum to be exceeding a predetermined threshold; and
determining, with the at least one of the electronic processor and the digital signal processor, that the modulation type of the interferer signal is not linear modulation in response to detecting the distortion-to-noise ratio pairs of positive and negative complex baseband frequency components in the frequency spectrum to be less than the predetermined threshold.

17. The method of claim 12, wherein the processing circuitry includes an external attenuator controllable to be (i) enabled such that the RF signal is attenuated by the external attenuator or (ii) disabled such that the RF signal is not attenuated by the external attenuator;
wherein determining the modulation type of the interferer signal based on the detection of or the lack of detection of the distortion terms in the frequency spectrum of the processed complex baseband signal at the frequencies corresponding to the integer multiples of the symbol rate of the linear modulation interferer includes comparing distortion-to-noise ratio pairs of positive and negative complex baseband frequency components of the processed complex baseband signal in the frequency spectrum to a predetermined threshold; and
wherein comparing the distortion-to-noise ratio pairs of positive and negative complex baseband frequency components of the processed complex baseband signal in the frequency spectrum to the predetermined threshold includes
using a first value for the predetermined threshold when the internal attenuator and the external attenuator are both disabled, and
using a second value for the predetermined threshold when at least one of the internal attenuator and the external attenuator is enabled, wherein the second value is different than the first value.

18. A communication device comprising:
an antenna configured to receive a radio frequency (RF) signal;
processing circuitry configured to receive the RF signal from the antenna and process the RF signal to generate a processed RF signal, wherein the processing circuitry includes an external attenuator controllable to be (i) enabled such that the RF signal is attenuated by the external attenuator or (ii) disabled such that the RF signal is not attenuated by the external attenuator;
a radio frequency integrated circuit (RFIC) configured to receive the processed RF signal, the RFIC including an internal attenuator controllable to be (i) enabled such that the processed RF signal is attenuated by the internal attenuator or (ii) disabled such that the processed RF signal is not attenuated by the internal attenuator, and the RFIC including a mixer configured to convert the processed RF signal to a baseband frequency to generate a processed complex baseband signal; and
a digital signal processor configured to
receive the processed complex baseband signal,
determine whether the processed complex baseband signal includes a linear modulation interferer signal having a second order intermodulation distortion (IM2) distortion-to-noise ratio above a predetermined threshold, and
in response to and based on determining that the processed complex baseband signal includes the linear modulation interferer signal having the second order intermodulation distortion distortion-to-noise ratio above the predetermined threshold, control whether at least one of the internal attenuator and the external attenuator is enabled.

19. The communication device of claim 18, wherein the digital signal processor is configured to:
determine that a received signal strength indication (RSSI) of a desired signal that forms at least part of the processed complex baseband signal is below a first RSSI threshold and above a second RSSI threshold, and in response to (i) determining that the RSSI of the desired is below the first RSSI threshold and above the second RSSI threshold and (ii) determining that the processed complex baseband signal includes the linear modulation interferer signal having the second order intermodulation distortion distortion-to-noise ratio above the predetermined threshold, control the internal attenuator to be enabled and control the external attenuator to be disabled.

20. The communication device of claim 18, wherein the digital signal processor is configured to determine whether the processed complex baseband signal includes the linear modulation interferer signal having the second order intermodulation distortion distortion-to-noise ratio above the predetermined threshold by:
   detecting distortion terms in a frequency spectrum of the processed complex baseband signal at frequencies corresponding to integer multiples of a symbol rate of the linear modulation interferer signal,
   calculating a distortion term power of each of the distortion terms;
   calculating a noise power among frequency bins associated with different frequency ranges not occupied by the distortion terms;
   calculating the distortion-to-noise ratio by dividing the distortion term power of each of the distortion terms by the noise power; and
   comparing the distortion-to-noise ratio for each distortion term to the predetermined threshold.

* * * * *